(12) United States Patent
Kajita

(10) Patent No.: US 9,975,479 B2
(45) Date of Patent: May 22, 2018

(54) VEHICULAR NOTIFICATION CONTROL APPARATUS AND VEHICULAR NOTIFICATION CONTROL SYSTEM

(71) Applicant: DENSO CORPORATION, Kariya, Aichi-pref. (JP)

(72) Inventor: Kentaro Kajita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/125,692

(22) PCT Filed: Feb. 26, 2015

(86) PCT No.: PCT/JP2015/000984
§ 371 (c)(1),
(2) Date: Sep. 13, 2016

(87) PCT Pub. No.: WO2015/141147
PCT Pub. Date: Sep. 24, 2015

(65) Prior Publication Data
US 2017/0008452 A1 Jan. 12, 2017

(30) Foreign Application Priority Data

Mar. 18, 2014 (JP) .................................. 2014-055232
Nov. 13, 2014 (JP) .................................. 2014-230773

(51) Int. Cl.
*B60Q 9/00* (2006.01)
*B60K 35/00* (2006.01)
(Continued)

(52) U.S. Cl.
CPC ................ *B60Q 9/00* (2013.01); *B60K 35/00* (2013.01); *B60R 16/02* (2013.01); *B60K 2350/906* (2013.01)

(58) Field of Classification Search
CPC ....................................................... B60Q 9/00
See application file for complete search history.

(56) References Cited

U.S. PATENT DOCUMENTS 9,215,659 B2 * 12/2015 Asrani .................. H04W 4/008
9,397,762 B2 * 7/2016 Magarida ............... H04B 17/00
(Continued)

FOREIGN PATENT DOCUMENTS

| JP | 2010130669 A | 6/2010 |
|----|--------------|--------|
| JP | 2014088128 A | 5/2014 |
| WO | WO-2006022191 A1 | 3/2006 |

*Primary Examiner* — Joseph Feild
*Assistant Examiner* — Pameshanand Mahase
(74) *Attorney, Agent, or Firm* — Harness, Dickey & Pierce, P.L.C.

(57) ABSTRACT

A vehicular notification control apparatus includes: an operation acceptance portion that accepts an instruction operation performed by a non-driving occupant for an equipment device providing a function available to a user in a vehicle interior; an output data acquisition portion that acquires output data in response to the instruction operation for notifying the driver of a result of processing; a notification control portion that makes a notification to the driver; and a drive load determination portion that determines whether drive load of the driver is high. The notification control portion makes the notification when the drive load determination portion determines that the drive load is not high at a time the output data acquisition portion has acquired the output data. The notification control portion withholds making the notification until the drive load determination portion determines that the drive load is not high.

11 Claims, 9 Drawing Sheets

(51) Int. Cl.
  *B60R 16/02* (2006.01)
  *F16H 63/42* (2006.01)
  *G08B 21/06* (2006.01)

(56) References Cited

U.S. PATENT DOCUMENTS

| | | |
|---|---|---|
| 2008/0309474 A1 | 12/2008 | Okamoto et al. |
| 2009/0179745 A1 | 7/2009 | Okamoto et al. |
| 2010/0138149 A1 | 6/2010 | Ohta et al. |
| 2012/0161927 A1* | 6/2012 | Pierfelice ................ H04L 63/10 340/5.83 |
| 2014/0028542 A1* | 1/2014 | Lovitt ..................... G06F 3/017 345/156 |
| 2014/0221781 A1* | 8/2014 | Schrauf ................ A61B 5/0205 600/301 |

* cited by examiner

VEHICULAR NOTIFICATION CONTROL APPARATUS AND VEHICULAR NOTIFICATION CONTROL SYSTEM

CROSS-REFERENCE TO RELATED APPLICATIONS

This application is a U.S. National Phase Application under 35 U.S.C. 371 of International Application No. PCT/JP2015/000984 filed on Feb. 26, 2015 and published in Japanese as WO 2015/141147 A1 on Sep. 24, 2015. This application is based on and claims the benefit of priority from Japanese Patent Application No. 2014-055232 filed on Mar. 18, 2014 and Japanese Patent Application No. 2014-230773 filed on Nov. 13, 2014.

TECHNICAL FIELDS

The present disclosure relates to a vehicular notification control apparatus and a vehicular notification control system controlling an image to be displayed on a display mounted on a vehicle and a sound to be outputted from a sound output device mounted on a vehicle.

BACKGROUND ART

A vehicular notification control apparatus is linked to various systems installed to a vehicle and controls a display to display an image corresponding to a control state of the systems. When the vehicular notification control apparatus accepts a driver's instruction operation for a system linked to the vehicular notification control apparatus, the vehicular notification control apparatus displays an image showing a result of processing in response to the operation on the display. For example, when a driver inputs an instruction for an operation to change a set temperature of an air-conditioning system, the air-conditioning system changes the set temperature to a control target value according to the operation while the vehicular notification control apparatus displays a newly-set present set temperature on the display.

Patent Literature 1 discloses a vehicular notification control apparatus capable of displaying multiple types of information simultaneously on a display (referred to as a driver display) such as a meter display, disposed in the sight of a driver facing in a front direction of a vehicle, which the driver is driving. Information displayed on the driver display includes, in addition to information indicating a vehicle state such as a travel speed, a peripheral map image near a present location provided by a navigation system, a set temperature of an air-conditioning system, and a title of a song an audio system is playing.

According to the vehicular notification control apparatus disclosed in Patent Literature 1, the driver looking ahead of the vehicle is able to see various types of information displayed on the driver display by shifting his/her eyes less than before.

Recently, further, according to a technique disclosed (see, for example, Patent Literature 2), a portable terminal such as a smartphone is connected to a vehicular notification control apparatus by short range wireless communication or by cable, and an image displayed on a display of the portable terminal is sent to the vehicular notification control apparatus, so that an image generated in the portable terminal is displayed on a vehicle onboard display.

An inventor of the present application has found the following about a vehicular notification control apparatus and a vehicular notification control system.

It is not necessarily a driver making an operation to change a control state of a system linked to the vehicular notification control apparatus. For example, an occupant other than a driver, such as an occupant seated on a front passenger's seat may change the set temperature of the air-conditioning system, adjust a playing volume of an audio device, or zoom in or out a displayed map image. When an operation made by the occupant other than the driver includes a control content that should be notified to the driver via the driver display, an image displayed on the driver display is changed in response to an operation by the occupant other than the driver.

In this case, a display screen of the driver display changes too sudden for the driver. The driver may have an uncomfortable feeling or become distracted by a change of the display screen. In other words, an operation by the occupant other than the driver may prevent a drive operation by the driver.

Also, the sound output device may output a sound in response to an operation made by the occupant other than the driver. In such a case, a sound is outputted unexpectedly for the driver. The driver may be bothered. Hence, an operation for the sound output device by the occupant other than the drive also may prevent a drive operation by the driver.

An input device via which the occupant other than the driver inputs an instruction such as a change of a set temperature of the air-conditioning system can adopt, for example, a switch group provided to an instrument panel. Alternatively, a portable terminal communicating with the vehicular notification control apparatus in two ways may be used as an input device via which an instruction is inputted to a system linked to the vehicular notification control apparatus.

PRIOR ART LITERATURES

Patent Literatures

Patent Literature 1: WO 2006/022191 A1
Patent Literature 2: JP 2010-130669 A

SUMMARY OF INVENTION

It is an object of the present disclosure to provide a vehicular notification control apparatus and a vehicular notification control system that is capable of reducing a probability that notification processing due to an operation by an occupant other than a driver becomes a hindrance to a drive operation by a driver.

According to a vehicular notification control apparatus of one aspect of the present disclosure, a vehicular notification control apparatus comprises: an operation acceptance portion that accepts an instruction operation performed by a non-driving occupant for an equipment device providing a function available to a user in a vehicle interior, the non-driving occupant being an occupant other than a driver; an output data acquisition portion that acquires output data outputted from the equipment device in response to the instruction operation received by the operation acceptance portion for notifying the driver of a result of processing according to the instruction operation; a notification control portion that makes a notification to the driver based on the output data acquired by the output data acquisition portion; and a drive load determination portion that determines whether drive load of the driver is high based on a sensor value outputted from a sensor and indicating a running state of a vehicle. The notification control portion makes the notification based on the output data acquired by the output data acquisition portion, when the drive load determination portion determines that the drive load is not high at a time the output data acquisition portion has acquired the output data. By contrast, the notification control portion withholds making the notification based on the output data until the drive load determination portion determines that the drive load is not high, when the drive load determination portion determines that the drive load is high at a time the output data acquisition portion has acquired the output data.

According to this configuration, in a case where a drive load determination portion determines that a drive load is high when an output data acquisition portion acquires the output data, a notification based on the output data is withheld until the drive load determination portion determines that a drive load is not high. In other words, while the drive load determination portion determines that a drive load of the driver is high, a notification control portion does not make notification on the basis of the output data the output data acquisition portion acquired in response to an operation by the non-driving occupant.

Herein, a state in which a drive load is high represents a state in which the driver needs to concentrate more intensely on a drive operation. A state in which a drive load is not high represents a state in which the driver is relaxed in making a drive operation. When the driver is relaxed in making a drive operation, notification made due to an operation by the non-driving occupant is less likely to prevent a drive operation by the driver. In other words, a case where notification made due to an operation by the non-driving occupant becomes a hindrance to a drive operation by the driver is a case where a drive load of the driver is high.

According to this configuration, no notification is made according to an operation by the non-driving occupant when a drive load is high. Consequently, it may be possible to prevent notification processing due to an operation by the non-driving occupant from becoming a hindrance to a drive operation by the driver.

According to a vehicular notification control system of another aspect of the present disclosure, a vehicular notification control system comprises: a vehicle onboard apparatus that controls an operation of a notification device notifying a driver of predetermined information; and a portable terminal that is brought into a vehicle and communicates with the vehicle onboard apparatus in two ways to provide a function available to a user in a vehicle interior. The portable terminal includes, a terminal-side operation acceptance portion accepting an instruction operation made by a non-driving occupant who is an occupant other than the driver for the portable terminal, and a terminal-side communication processing portion controlling communications with the vehicle onboard apparatus, the terminal-side communication processing portion sending output data to notify the driver of a result of processing performed by the portable terminal according to the instruction operation accepted at the terminal-side operation acceptance portion to the vehicle onboard apparatus. The vehicle onboard apparatus includes, a vehicle-side communication processing portion controlling communications with the terminal-side communication processing portion, an output data acquisition portion acquiring the output data sent from the terminal-side communication processing portion via the vehicle-side communication processing portion, a notification control portion controlling an operation of the notification device and notifying the driver of a result of processing performed by the portable terminal based on the output data acquired by the output data acquisition portion, and a drive load determination portion determining whether a drive load of the driver is high based on a sensor value, which is outputted from a sensor and indicates a running state of the vehicle. The notification control portion makes a notification based on the output data acquired by the output data acquisition portion, when the drive load determination portion determines that the drive load is not high at a time the output data acquisition portion has acquired the output data. The notification control portion withholds making the notification based on the output data until the drive load determination portion determines that the drive load is not high, when the drive load determination portion determines that the drive load is high at a time the output data acquisition portion has acquired the output data.

According to this configuration, as with the vehicular notification control apparatus according to the one aspect of the present disclosure, while the drive load determination portion determines that a drive load of the driver is high, the notification control portion does not make notification on the basis of the output data the output data acquisition portion acquired in response to an operation by the non-driving occupant.

Thus according to this configuration, no notification is made according to an operation by the non-driving occupant when a drive load is high. It may be possible to prevent notification processing due to an operation by the non-driving occupant from becoming a hindrance to a drive operation by the driver.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

First Embodiment

Figure 1:
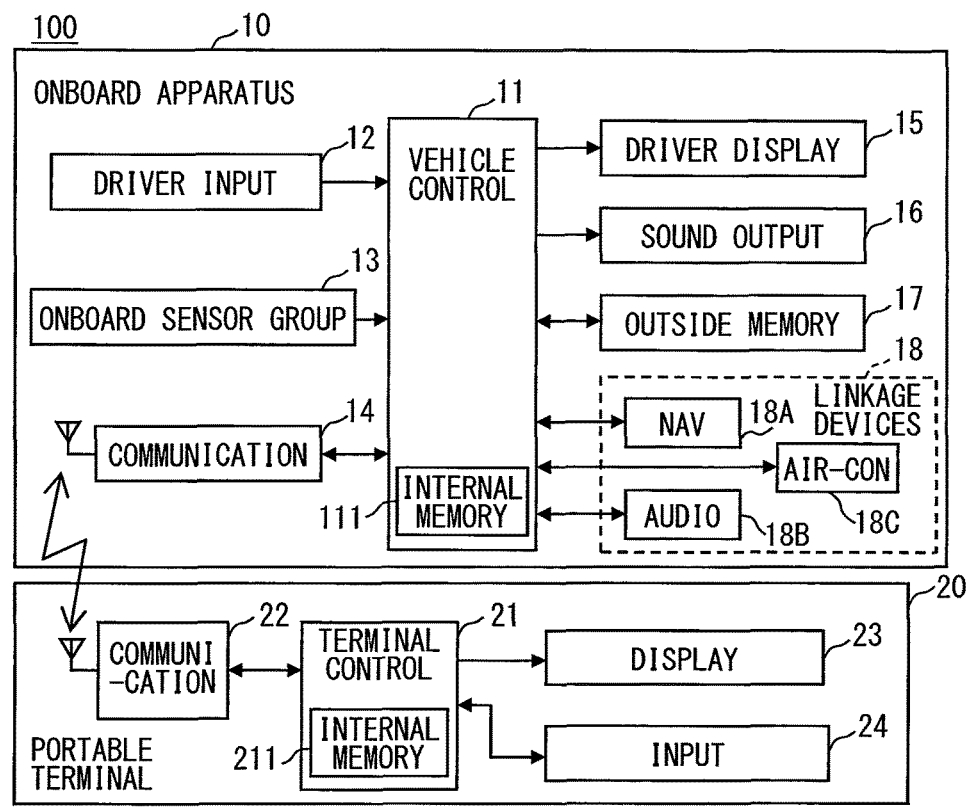
FIG. 1 is a block diagram showing an example of a schematic configuration of a vehicular notification control system according to a first embodiment.

Hereinafter, a first embodiment of the present disclosure will be described using the drawings. FIG. 1 is a view showing an example of a schematic configuration of a vehicular notification control system 100 of the present embodiment. As is shown in FIG. 1, the vehicular notification control system 100 includes a vehicle onboard apparatus 10 installed to a vehicle and a portable terminal 20 brought into the vehicle by a user and communicating with the vehicle onboard apparatus 10 in two ways. The portable terminal 20 corresponds to an equipment device of the present disclosure.

The portable terminal 20 is a portable terminal which is installed with an application program (referred to as a vehicle onboard apparatus linked application) enabling the portable terminal to operate as the portable terminal 20 included in the vehicular notification control system 100 such as a smartphone, A typical portable terminal operates as the portable terminal 20 included in the vehicular notification control system 100 while the vehicle onboard apparatus linked application is running. It is sufficient for the portable terminal 20 to have a communication function to communicate with the vehicle onboard apparatus 10 in two ways. For example, a tablet terminal may be adopted as the portable terminal 20, in addition to a smartphone. Some of configurations of a typical smartphone are not necessary when the present embodiment is described and a description of such configurations is omitted herein for convenience.

Hereinafter, a vehicle that is mounted with the vehicular notification control system 100 is referred to as a subject vehicle. An occupant in the subject vehicle other than a driver is referred to as a non-driving occupant. The non-driving occupant is also referred to as a passenger, for example. The driver and the non-driving occupant are collectively referred to as a user when the driver and the non-driving occupant are not distinguished from each other as to who makes an operation. A more concrete configuration will be described in the following.

(Configuration of Vehicle Onboard Apparatus 10)

As is shown in FIG. 1, the vehicle onboard apparatus 10 includes a vehicle-side control portion 11, a driver input device 12, a vehicle onboard sensor group 13, a vehicle-side communication portion 14, a driver display 15, a sound output device 16, an outside memory 17, and a linked equipment device 18. The linked equipment device 18 also corresponds to the equipment device of the present disclosure.

The linked equipment device 18 is an equipment device that performs various types of processing according to user operations. Examples of the linked equipment device 18 in the present embodiment are a navigation equipment device 18A, an audio equipment device 18B, and an air-conditioning equipment device 18C. In the present embodiment, the vehicle-side control portion 11 and the linked equipment device 18 such as the navigation equipment device 18A are represented by separate blocks in the drawing. It should be appreciated that functions equivalent to the respective linked equipment device 18 may be furnished to the vehicle-side control portion 11 in itself. The vehicle-side control portion 11 may have functions equivalent to each linked equipment device 18.

The present embodiment describes a case where the vehicle onboard apparatus 10 includes the navigation equipment device 18A and the audio equipment device 18B, for example. It should be appreciated that the present disclosure is not limited to the configuration as above. The portable terminal 20 may have a function (navigation function) equivalent to the navigation equipment device 18A and a function (audio function) equivalent to the audio equipment device 18B. Such an alternative configuration will be described in a fourth embodiment below.

The navigation function, the audio function, and a function (air-conditioning function) provided by the air-conditioning equipment device 18C correspond to examples of a function available to the user in a vehicle compartment. Also, in the present embodiment, the navigation equipment device 18A, the audio equipment device 18B, and the air-conditioning equipment device 18C correspond to equipment devices which provide functions available to the user in the vehicle compartment.

The vehicle-side control portion 11, the driver input device 12, the vehicle onboard sensor group 13, the vehicle-side communication portion 14, the driver display 15, the sound output device 16, the outside memory 17, the navigation equipment device 18A, the audio equipment device 18B, and the air-conditioning equipment device 18C communicate with one another in two ways via a known vehicle internal network.

The driver input device 12 is a mechanical switch (a so-called steering switch) provided to a steering wheel. For example, the steering switch as the driver input device 12 includes multiple switches, and functions customized for the driver are assigned to the respective switches. By operating the driver input device 12, the driver is able to direct respective linked equipment device 18 to perform various types of processing. For example, by operating the driver input device 12, the driver is able to direct the audio equipment device 18B when the driver selects a song or an album which the driver wishes to play, plays or stops a song, and adjusts a volume. It goes without saying that the driver is also able to direct the air-conditioning equipment device 18C when the driver wishes to change a set temperature and start or stop of the air-conditioning equipment device 18C.

Upon detection of an input operation by the driver, the driver input device 12 outputs a control signal indicating the input operation to the vehicle-side control portion 11. Hereinafter, the control signal outputted from the driver input device 12 will be referred to as a driver-side control signal, for convenience.

In the present embodiment, the steering switch is adopted as the driver input device 12. It should be appreciated that the driver input device 12 is not limited to the steering switch. The driver input device 12 may be a speech-input device realized by using a known speech recognition technique. Further, the driver input device 12 may be a mechanical switch disposed to an instrument panel at an easy-to-operate position for the driver making a drive operation. Furthermore, when the driver display 15 described below is located within arm's reach of the driver, the driver input device 12 may be a known touch panel provided integrally with the driver display 15.

The vehicle onboard sensor group 13 includes various sensors installed to the subject vehicle to detect states of the subject vehicle. Examples of various sensors include a vehicle speed sensor, an acceleration sensor, a gyro sensor, a GNSS receiver, a steering angle sensor, a brake stroke sensor, an accelerator pedal sensor, and a turn-signal lever position sensor.

The vehicle speed sensor detects a travel speed of the subject vehicle. The acceleration sensor detects acceleration acting on the subject vehicle. The GNSS receiver acquires data specifying a present location of the GNSS receiver by receiving an electric wave from a satellite employed in the GNSS (Global Navigation Satellite System). The GNSS receiver can be, for example, a GPS receiver.

The gyro sensor detects an angular velocity of rotation about a vertical axis of the subject vehicle. The steering angle sensor detects a steering angle on the basis of a turning angle of the steering wheel. The brake stroke sensor detects a depressed amount of a brake pedal. The accelerator pedal sensor detects a depressed amount of an accelerator pedal. The turn-signal lever position sensor detects whether a turn-signal lever is at a left-turning position or a right-turning position. Values (referred to as sensor values) detected by the various sensors included in the vehicle onboard sensor group 13 are successively outputted to the vehicle-side control portion 11. Information indicating states of the subject vehicle detected by the sensors included in the vehicle onboard sensor group 13 is referred to also as vehicle information.

In addition to the parameters specified above, the vehicle information includes an engine rotation speed, a remaining amount of fuel, an engine cooling water temperature, a total travel distance, a shift position, a door locked or unlocked state, a seat-belt ON or OFF state, and a light ON or OFF state. The vehicle information also includes information notifying the driver of an abnormality in the event of an abnormality in a drive system including the engine.

The vehicle-side communication portion 14 includes a transmitting and receiving antenna. The vehicle-side communication portion 14 transmits data to and receives data from a terminal-side communication portion 22 included in the portable terminal 20 by wireless communication. The vehicle-side communication portion 14 and the terminal-side communication portion 22 may communicate in accordance with known communication standards. For example, short range wireless communication standards such as Bluetooth (registered trademark) and ZigBee (registered trademark), and wireless LAN standards such as IEEE802.11 can be adopted as the standards for communications between the vehicle-side communication portion 14 and the terminal-side communication portion 22. In the present embodiment, the vehicle onboard apparatus 10 and the portable terminal 20 transmit and receive data by wireless communication. It should be appreciated that the vehicle onboard apparatus 10 and the portable terminal 20 may be configured to transmit and receive data by cable communication such as USB communication.

The driver display 15 is a display disposed at a position in the sight of the driver facing in a front direction of the subject vehicle. In the present embodiment, a meter display disposed to the instrument panel in an upper part on a driver's seat side is adopted as the driver display 15.

The driver display 15 notifies the driver of various types of information by displaying a text or an image according to an instruction from the vehicle-side control portion 11. The driver display 15 is, for example, a full-color display and can be a liquid crystal display, an organic EL display, a plasma display, or the like.

The driver display 15 is disposed at a position in the sight of the driver facing in the front direction of the subject vehicle. Hence, the driver who is watching the front of the subject vehicle is able to confirm various types of information displayed on the driver display 15 by shifting his/her eyes less than before. In other words, an amount the driver has to shift his/her eyes to confirm the information becomes smaller. It may be possible to reduce a focusing load and increase safety.

The driver display 15 is not necessarily disposed to the instrument panel in an upper part on the driver's seat side, and may be disposed to the instrument panel in an upper part in the vicinity of a center in a vehicle width direction near the driver's seat. Alternatively, the driver display 15 may be a known head-up display that displays various types of information by showing a virtual image in a part of a windshield in front of the driver's seat. The driver display 15 only has to be set at a position at which an angle between a line extending from a center of a head rest of the driver's seat in the front direction of the vehicle and a line extending from the center of the head rest of the driver's seat to the driver display 15 is equal to or less than a predetermined angle (for example, 30 degrees). The predetermined angle may be determined according to an average effective view angle of humans.

The sound output device 16 includes speakers or the like. The sound output device 16 converts sound data inputted from the vehicle-side control portion 11 to a sound (including a mere tone), and outputs the converted sound. The driver display 15 and the sound output device 16 correspond to an example of a notification device of the present disclosure.

The outside memory 17 includes a rewritable non-volatile storage medium and a device that reads data from and writes data into the storage medium. A known storage medium such as a magnetic disc, an optical disc, and a flash memory can be used as the storage medium included in the outside memory 17. In the present embodiment, a removable storage medium such as an SD card is used as the storage medium included in the outside memory 17 as an example. A DVD, a CD, or a HDD is also adopted as the storage medium.

The outside memory 17 stores navigation data, music data, and so on, which are data used when the linked equipment device 18 performs various functions provided to the driver. The navigation data is data for the navigation equipment device 18A to perform route guidance processing, and includes map data and guidance sound data. The map data includes geographical information such as map drawing data to display a map, road data used for various types of processing such as map matching, route search, and route guidance, and intersection data made up of detailed data of intersections. The road data shows a relation of road connections. The guidance sound data is sound data to be outputted as a sound from the sound output device 16 during a guidance control described below.

In the music data, data of multiple songs are saved in a hierarchical structure according to attributes such as albums containing the songs, artists, and musical genres.

The navigation equipment device 18A has a function similar to a function furnished to a known navigation apparatus, and performs, for example, route guidance processing to guide the driver to travel along a guide route using the navigation data saved in the outside memory 17. The navigation equipment device 18A also includes present location detection processing, route calculation processing, and guidance control processing as execution units of segmented processing to perform the route guidance processing.

In the present location detection processing, the navigation equipment device 18A detects a present location of the subject vehicle (for example, every 100 milliseconds) on the basis of signals inputted from the GNSS receiver, the vehicle speed sensor, and the gyroscope included in the vehicle onboard sensor group 13.

The route calculation processing calculates a recommended route, which is a route from a start point such as a present location to a destination the user has set and satisfies a predetermined condition such as a distance priority and a time priority by using a known search method. The recommended route calculated in the route calculation processing is set as a guide route by a user operation to determine that the recommended route is a route which the user would like to travel along.

In the guidance control processing, the navigation equipment device 18A performs control processing on the basis of a present location of the subject vehicle and the guide route, and provides the user with information that enables the driver to make a drive operation smoothly by outputting a sound and displaying a simple map. For example, in the guidance control processing, the navigation equipment device 18A generates image data (referred to as a guide map image) indicating the guide route and a vehicle location of the subject vehicle to be displayed on the driver display 15, and outputs the guide map image to the driver-side control portion 11. When the subject vehicle reaches a point a predetermined distance before a guide intersection, the navigation equipment device 18A acquires guidance sound data to be outputted from the sound output device 16 as a sound which instructs the driver to take a right turn or a left turn from the outside memory 17, and outputs the acquired guidance sound data to the vehicle-side control portion 11.

When a destination is not set, the navigation equipment device 18A generates image data (referred to as a peripheral map) showing a map image near the present location, and outputs the peripheral map image to the vehicle-side control portion 11.

After the navigation equipment device 18A performs processing according to a user operation, the navigation equipment device 18A outputs data of an image corresponding to a result of the processing and sound data corresponding to the image to the vehicle-side control portion 11. In other words, in response to the user operation, the navigation equipment device 18A outputs image data to be displayed on the driver display 15 and sound data to be outputted as a sound from the sound output device 16 when the image is outputted and displayed to the vehicle-side control portion 11.

For example, after the route calculation processing, the navigation equipment device 18A generates a route determination image to be displayed as a screen (referred to as a route determination screen) to accept a user operation to set the calculated recommended route as a guide route, and outputs it to the vehicle-side control portion 11. When the navigation equipment device 18A receives the user operation to set a destination, the navigation equipment device 18A generates a destination setting image to be displayed as a screen to let the user set a destination and outputs the destination setting image to the vehicle-side control portion 11.

The audio equipment device 18B performs song play processing to playback song data saved in the outside memory 17 according to an instruction from the vehicle-side control portion 11. The instruction from the vehicle-side control portion 11 corresponds to the user operation. The audio equipment device 18B outputs image data corresponding to processing currently called out by a user operation to the vehicle-side control portion 11.

For example, the audio equipment device 18B outputs album selection screen data to be displayed as a screen to let the user select an album which the user wishes to play among multiple albums saved in the outside memory 17 and song selection screen data to be displayed as a screen (referred to as a song selection screen) to let the user select a song which the user wishes to play to the vehicle-side control portion 11.

While the audio equipment device 18B is performing the song play processing, the audio equipment device 18B outputs song play data generated according to data of a song that is playing to the vehicle-side control portion 11 together with the song play image data to be displayed as a song play screen showing a title and a performance time of the song and an elapsed time from the beginning of the song. The song play data is sound data to be outputted as a sound from the sound output device 16.

The air-conditioning equipment device 18C adjusts a temperature and humidity in the vehicle interior by controlling an operation of a non-shown compressor or the like according to an instruction from the vehicle-side control portion 11. For example, the air-conditioning equipment device 18C adjusts a volume of air blown out from an air blowing port and a temperature of air blown out for a temperature in the vehicle interior to reach and stay at a value specified by the user. In addition, the air-conditioning equipment device 18C is provided with multiple air blowing ports and selectively controls the multiple air blowing ports that blow out hot air (or cold air) among air blowing ports.

The air-conditioning equipment device 18C generates image data to be displayed on the driver display 15 or a terminal-side display 23 as an image indicating a present operation state at least while in operation, and outputs the image data to the vehicle-side control portion 11. It is sufficient to indicate whether the air-conditioning equipment device 18C is in operation, a set temperature and an operation mode, by the image data outputted from the air-conditioning equipment device 18C to the vehicle-side control portion 11. The operation mode includes a cooling mode, a heating mode, and a ventilation mode. Types and layouts of information included in the image data outputted from the air-conditioning equipment device 18C may be switched according to a user operation.

Hereinafter, the image data to be displayed on the driver display 15 and the sound data to be outputted as a sound from the sound output device 16, that is, data outputted from the linked equipment device 18 to the vehicle-side control portion 11 in response to a user operation is referred to as output data. In the present embodiment, the output data includes at least the image data, and when the output data includes the sound data, the image data and the sound data are correlated with each other.

When the image data is outputted, the linked equipment device 18 outputs the image data to the vehicle-side control portion 11 together with a screen ID, which is a number uniquely assigned to each item of image data in the linked equipment device 18. Likewise, the sound data is outputted to the vehicle-side control portion 11 together with a sound ID, which is a number uniquely assigned to each item of sound data.

The vehicle-side control portion 11 is configured to operate as a typical computer and includes known components, namely, a CPU, a non-volatile memory such as a ROM and a flash memory, a volatile memory such as a RAM, a I/O, and a bus line interconnecting the foregoing components (none of which is shown). An internal memory 111 included in the vehicle-side control portion 11 is a rewritable, non-volatile storage medium and realized by, for example, the flash memory included in the vehicle-side control portion 11.

The internal memory 111 stores program modules and data to perform various types of processing. The internal memory 111 also stores identifiers (referred to as an equipment ID) uniquely set to the respective linked equipment device 18 to distinguish the multiple linked equipment devices 18 from one another.

Figure 2:
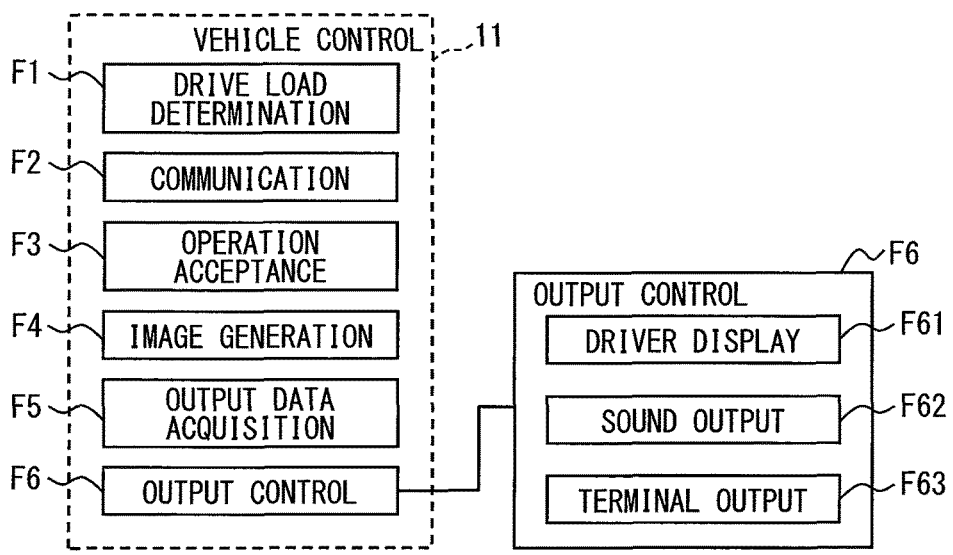
FIG. 2 is a block diagram showing an example of a schematic configuration of a vehicle-side control portion of the first embodiment.

A function realized when the vehicle-side control portion 11 runs various program modules stored in the internal memory 111 will be described by referring to FIG. 2. As is shown in FIG. 2, the vehicle-side control portion 11 includes a drive load determination portion F1, a vehicle-side communication processing portion F2, an operation acceptance portion F3, a vehicle information image generation portion F4, an output data acquisition portion F5, and an output control portion F6 each as a functional block. The vehicle-side control portion 11 including the various functional blocks corresponds to a vehicular notification control apparatus of the present disclosure.

The drive load determination portion F1 determines whether a drive load of the driver is high on the basis of the vehicle information inputted from the various sensors included in the vehicle onboard sensor group 13. Incidentally, a state in which a drive load of the driver is high represents a state in which the driver needs to concentrate more intensely on a drive operation (including safety confirmation in the surroundings).

Herein, the drive load determination portion F1 sets thresholds (also referred to as load determination thresholds) for respective parameters, namely, a vehicle speed, acceleration, a steering angle, and a yaw rate, and determines whether a drive operation is high on the basis of the load determination thresholds. When any one of the parameters specified above exceeds the corresponding load determination threshold, the drive load determination portion F1 determines that a drive load is high.

The load determination thresholds may be set appropriately for the respective parameters. Conditions under which the drive load determination portion F1 determines that a drive load is high by using the parameters may be designed as needed. For example, the drive load determination portion F1 may determine that a drive load is high when a predetermined number (for example, two) of parameters among the parameters specified above reach or exceed the corresponding load determination thresholds.

When a position of the turn-signal lever detected by the turn-signal lever position sensor is a position to light a turn-signal lamp, the drive load determination portion F1 determines that a drive load of the driver is high for the reason as follows. That is, when the turn-signal lever is shifted to a position to light the turn-signal lamp, it represents that the driver is going to take a left or light turn at an intersection or switch lanes. In either case, the driver needs to confirm safety in the surroundings more carefully, so that a drive load of the driver becomes relatively high. The above described a case where the turn-signal lamp is adopted as a direction indicator. It should be appreciated that the direction indicator is not limited to the turn-signal lamp and can be any device informing the other drivers or nearby pedestrians of a direction the subject vehicle is heading when the driver is taking a left or right turn or switching lanes.

Alternatively, the drive load determination portion F1 may determine that a drive load is high while the subject vehicle is running and a drive load is not high (that is, low) while the subject vehicle is stopped. Whether the subject vehicle is running may be determined on the basis of an output value from the vehicle speed sensor or an emergency brake sensor. More specifically, the drive load determination portion F1 determines that the subject vehicle is stopped when a vehicle speed drops to 0 (or to a predetermined speed or below) and determines that the subject vehicle starts running when a vehicle speed becomes greater than 0 (or greater than a predetermined speed). Also, the drive load determination portion F1 may determine that the subject vehicle is stopped when the emergency brake is applied.

The drive load determination portion F1 may generate time-series data in which parameters detected by the various sensors such as a vehicle speed, acceleration, a steering angle, and a yaw rate are aligned in time series. In such a case, the drive load determination portion F1 determines whether a running state is stable on the basis of the time-series data of each parameter and determines whether a drive load is high according to a determination result. For example, when the time-series data of a vehicle speed reveals that a vehicle speed varies considerably within a certain time, the drive load determination portion F1 determines that a running state is not stable and hence a drive load is high. Whether a vehicle speed varies considerably may be determined on the basis of a distribution or a difference between a maximum value and an average value of the vehicle speed within the certain time.

Further, the drive load determination portion F1 may obtain a type of road or a road shape of a road the subject vehicle is traveling along from the navigation equipment device 18A, and may determine whether a drive load is high on the basis of the obtained type of road or the obtained road shape. For example, when the subject vehicle is travelling a freeway, the drive load determination portion F1 determines that a drive load is high. In a case where the drive load determination portion F1 determines a drive load on the basis of a road shape, the drive load determination portion F1 may determine that a drive load is high when the subject vehicle is making a sharp turn. The navigation equipment device 18A may determine a type of road or a road shape of the road the subject vehicle is traveling along on the basis of a present location detected in the present location detection processing and the map data and output the type of road or the road shape thus determined to the vehicle-side control portion 11.

The vehicle-side communication processing portion F2 controls the vehicle-side communication portion 14 to send data to and receive data from the portable terminal 20. For example, the vehicle-side communication processing portion F2 receives a control signal (also referred to as an outside control signal) indicating an operation made on a terminal-side input device 24 by the non-driving occupant. The outside control signal received at the vehicle-side communication processing portion F2 from the portable terminal 20 indicates a control content the non-driving occupant is requesting for the linked equipment device 18 to perform. Also, the vehicle-side communication processing portion F2 sends control result data generated in a terminal output control portion F63 described below to the portable terminal 20. The terminal-side input device 24 corresponds to an input device of the present disclosure.

The operation acceptance portion F3 receives an instruction operation for any linked equipment device 18 from the user. For example, the operation acceptance portion F3 identifies the linked equipment device 18 the driver wishes to operate on the basis of a driver-side control signal inputted from the driver input device 12, and directs the identified linked equipment device 18 to perform a control corresponding to the control signal. An instruction operation inputted from the driver via the driver input device 12 corresponds to a driver operation of the present disclosure.

Upon receipt of the outside control signal, the operation acceptance portion F3 performs processing corresponding to a content indicated by the outside control signal. The processing when the outside control signal is received will be described when a configuration of the portable terminal 20 is described below. The operation acceptance portion F3 is referred to also as a vehicle-side operation acceptance portion. An instruction operation corresponding to the outside control signal in the present embodiment corresponds to an instruction operation by the non-driving occupant of the present disclosure.

The vehicle information image generation portion F4 generates a vehicle information image (including a text display) on the basis of the vehicle information inputted from the vehicle onboard sensor group 13. The vehicle information image is an image showing a part of the vehicle information necessary to run the subject vehicle such as a travel speed, an engine rotation speed, and a remaining amount of fuel (a remaining amount of charges in a battery in the case of an electric vehicle). Types of information displayed as the vehicle information image may be designed as needed. It should be noted that the vehicle information image inevitably includes information legally required to be displayed such as a travel speed. In the present embodiment, instruments indicating a travel speed and an engine rotation speed are analog meters. It should be appreciated that the instruments may be digital meters instead.

The output data acquisition portion F5 acquires output data to be outputted from the linked equipment device 18 in response to a user operation.

The output control portion F6 performs processing for the output data the output data acquisition portion F5 acquired, to be outputted and displayed on the driver display 15 and the terminal-side display 23 described below or to be outputted as a sound from the sound output device 16. The output control portion F6 includes a driver display control portion F61, a sound output control portion F62, and the terminal output control portion F63 each as a segmented functional block. The output control portion F6 corresponds to a notification control portion of the present disclosure.

The driver display control portion F61 generates an image (referred to as a driver image) to be displayed on the driver display 15 on the basis of the vehicle information image generated in the vehicle information image generation portion F4 and the image data the output data acquisition portion F5 acquired from the linked equipment device 18. The driver display control portion F61 outputs the generated driver image to the driver display 15 for the driver image to be displayed. Hereinafter, the image data the output data acquisition portion F5 acquired from the linked equipment device 18 is referred to as an equipment image, for convenience.

More specifically, the driver display control portion F61 determines a layout of a driver image obtained by combining the vehicle information image and the equipment image according to a type of the linked equipment device 18 from which the equipment image is outputted. Subsequently, the driver display control portion F61 generates a final driver image to be displayed on the driver display 15 by placing the vehicle information image and the equipment image according to the determined layout. The layout of the driver image may be set by the driver, changed according to a type of the linked equipment device 18 in operation, or changed depending on whether the subject vehicle is running. The method described in Patent Literature 1 may be used as a method of generating the driver image.

Herein, the vehicle information image is updated successively and displayed on the driver display 15 whereas timing at which to update the equipment image obtained from the linked equipment device 18 and timing at which to change the layout of the driver image are determined according to a drive load determined by the drive load determination portion F1. The timing at which to change a content of the driver image will be described when output arbitration processing will be described.

The sound output control portion F62 provides sound data the output data acquisition portion F5 acquired from the linked equipment device 18 to the sound output device 16 for the sound data to be outputted as a sound. A sound outputted from the sound output device 16 includes music played by the song play processing, a guidance sound during the route guidance, an operation sound in response to a user operation, a dialog speech of speech recognition, an automatic mail reading voice, or the like. Timing at which the sound output device 16 outputs the sound data the output data acquisition portion F5 acquired from the linked equipment device 18 will be described when the output arbitration processing will be described below.

The terminal output control portion F63 generates control result data including the equipment image the output data acquisition portion F5 acquired, the screen ID of the acquired equipment image, and the equipment ID of the linked equipment device 18 from which the equipment image is outputted, and sends the control result data to the portable terminal 20 via the vehicle-side communication processing portion F2 whenever necessary.

(Configuration of Portable Terminal 20)

As described in the beginning, the portable terminal 20 is a known portable terminal such as a smartphone. In the vehicular notification control system 100, the portable terminal 20 operates as an input device via which the non-driving occupant directs the linked equipment device 18 included in the vehicle onboard apparatus 10 to perform various operations.

The driver by himself/herself may bring the portable terminal 20 into the subject vehicle. However, the driver is making a drive operation and is able to instruct the linked equipment device 18 to perform various operations via the driver input device 12. The driver is therefore least likely to instruct the linked equipment device 18 to perform various operations via the portable terminal 20. The user who operates the portable terminal 20 is assumed to be the non-driving occupant.

As is shown in FIG. 1, the portable terminal 20 includes a terminal-side control portion 21, the terminal-side communication portion 22, the terminal-side display 23, and the terminal-side input device 24. The terminal-side communication portion 22 communicates with the vehicle-side communication portion 14 in two ways. Hence, the terminal-side communication portion 22 receives data sent from the vehicle-side communication portion 14 and transfers the received data to the terminal-side control portion 21 and also sends data inputted from the terminal-side control portion 21 to the vehicle-side communication portion 14.

The terminal-side display 23 displays a text and an image according to an input from the terminal-side control portion 21. The terminal-side input device 24 is a touch panel provided integrally with the terminal-side display 23. When touched by the user, the terminal-side input device 24 detects the touching and outputs a touch-position signal specifying a position (also referred to as a touch position) where the user has touched on the touch panel to the terminal-side control portion 21.

The touch panel may be a capacitance touch panel or a resistive touch panel or any other type. It goes without saying that the terminal-side input device 24 may use a mechanical switch. The terminal-side input device 24 corresponds to an example of the input device of the present disclosure.

The terminal-side control portion 21 is configured to operate as a typical computer and includes known components, namely, a CPU, a non-volatile memory such as a ROM and a flash memory, a volatile memory such as a RAM, a I/O, and a bus line interconnecting the foregoing components (none of which is shown).

An internal memory 211 included in the terminal-side control portion 21 is a rewritable, non-volatile storage medium and realized by, for example, the flash memory included in the terminal-side control portion 21. The internal memory 211 stores program modules (for example, vehicle onboard apparatus linked application) and data to perform various types of processing. An outside memory provided outside the terminal-side control portion 21 may be used instead of the internal memory 211 included in the terminal-side control portion 21.

Figure 3:
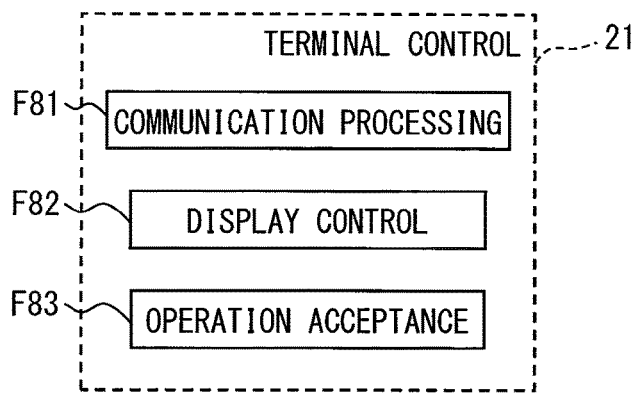
FIG. 3 is a block diagram showing an example of a schematic configuration of a terminal-side control portion.

A function provided when the terminal-side control portion 21 runs the vehicle onboard apparatus linked application stored in the internal memory 211 will be described using FIG. 3. As is shown in FIG. 3, the terminal-side control portion 21 includes a terminal-side communication processing portion F81, a terminal-side display control portion F82, and a terminal-side operation acceptance portion F83 each as a functional block.

The terminal-side communication processing portion F81 controls the terminal-side communication portion 22 to establish communications (so-called pairing) with the vehicle-side communication portion 14 when the vehicle onboard apparatus linked application starts. Once the communications between the terminal-side communication portion 22 and the vehicle-side communication portion 14 are established, the terminal-side communication processing portion F81 receives the control result data generated in the terminal output control portion F63 of the vehicle-side control portion 11 and sends an outside control signal generated in the terminal-side operation acceptance portion F83 to the vehicle-side control portion 11.

Upon receipt of the control result data generated in the terminal output control portion F63 of the vehicle-side control portion 11, the terminal-side communication processing portion F81 stores the equipment image and the screen ID of the equipment image included in the control result data into the internal memory 211 by discriminating each equipment ID of the linked equipment devices 18 corresponding to an output source of the equipment image. Herein, assume that the terminal-side communication processing portion F81 acquires information of the linked equipment device 18 included in the vehicle onboard apparatus 10 from the vehicle-side control portion 11 and stores the acquired information into the internal memory 211 as initial setting processing when the communications between the terminal-side communication portion 22 and the vehicle-side communication portion 14 are established. For example, a service and the equipment ID of each item of the linked equipment device 18 are acquired as the information of the linked equipment device 18.

The terminal-side display control portion F82 controls the terminal-side display 23 to display an equipment image received at the latest time among the equipment images stored in the internal memory 211. It is sufficient for the terminal-side display 23 to display information to let the user select a linked equipment device 18 as a control target among the multiple linked equipment devices 18 and information necessary to operate the linked equipment device 18 the user has selected as the control target.

The information to let the user select the linked equipment device 18 as a control target corresponds to a switch button functioning as a button to switch the linked equipment device 18 selected as the control target. The information necessary to operate the linked equipment device 18 the user has selected as the control target corresponds to options when the user inputs instructions for the linked equipment device 18.

A display configuration showing a control state of the linked equipment device 18 on the terminal-side display 23 is a matter of design arbitrarily selected. Herein, as an example of the display configuration, the equipment image of the linked equipment device 18 the user has specified as the control target is displayed in a predetermined region within a display region provided to the terminal-side display 23. Hereinafter, the region in which the equipment image is displayed is referred to as the equipment image region.

The terminal-side operation acceptance portion F83 obtains a touch-position signal inputted from the terminal-side input device 24. The linked equipment device 18 as the control target is switched to another according to the touch position. Upon acceptance of a touch operation on the equipment image region, the terminal-side operation acceptance portion F83 generates an outside control signal including the touch position on the equipment image (corresponding to a touch position within the equipment image) and sends the outside control signal to the vehicle-side control portion 11 via the terminal-side communication portion 22 and the vehicle-side communication portion 14. The outside control signal includes the equipment ID and the screen ID of the equipment image of the linked equipment device 18 set as the control target in the portable terminal 20 in addition to the touch position within the equipment image.

Upon obtaining the outside control signal sent from the terminal-side control portion 21, the operation acceptance portion F3 of the vehicle-side control portion 11 identifies the linked equipment device 18 set as the control target on the basis of the equipment ID of the linked equipment device 18 included in the outside control signal. Subsequently, the operation acceptance portion F3 outputs operation content information including the screen ID and the touch position within the equipment image to the identified linked equipment device 18. Upon input of the operation content information, the linked equipment device 18 determines a content of the user operation on the basis of the screen ID and the touch position within the equipment screen and performs processing corresponding to the user operation. When the processing is completed, the linked equipment device 18 outputs the output data to the vehicle-side control portion 11 as described above.

Figure 4:
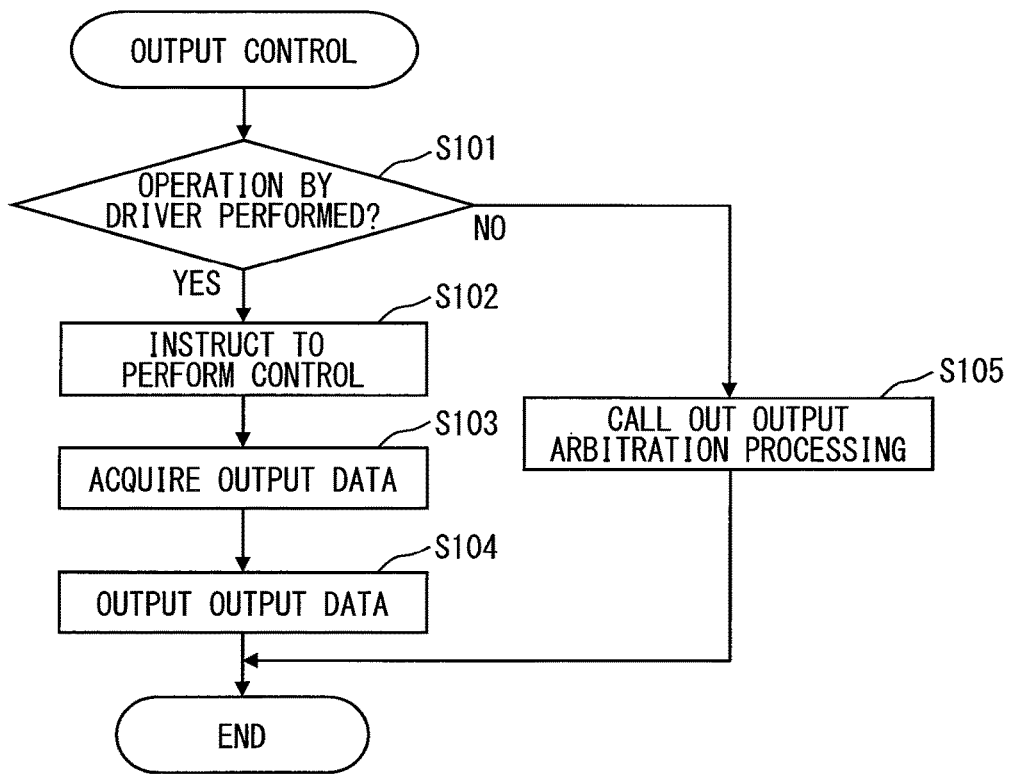
FIG. 4 is a flowchart illustrating output control related processing performed by the vehicle-side control portion.

Output control related processing performed by the vehicle-side control portion 11 will be described using a flowchart of FIG. 4. The output control related processing is a series of processing steps to output the output data acquired from the linked equipment device 18 in response to the user operation. The flowchart of FIG. 4 is started, for example, when a driver-side control signal is inputted into the vehicle-side control portion 11 from the driver input device 12 or when an outside control signal is inputted from the vehicle-side communication portion 14, that is, when the user operation for the linked equipment device 18 is made.

Firstly in Step S101, the operation acceptance portion F3 determines whether the operation for the linked equipment device 18 is made by the driver. Whether the operation for the linked equipment device 18 is made by the driver may be determined according to an output source of a control signal inputted into the vehicle-side control portion 11.

More specifically, when the control signal inputted into the vehicle-side control portion 11 is a control signal outputted from the driver input device 12 (that is, the driver-side control signal), the operation acceptance portion F3 determines that the operation for the linked equipment device 18 is made by the driver. In such a case, a determination of YES is made in Step S101 and advancement is made to Step S102.

When the control signal inputted into the vehicle-side control portion 11 is not outputted from the driver input device 12, the operation acceptance portion F3 determines that the operation for the linked equipment device 18 is not made by the driver. In such a case, a determination of NO is made in Step S101 and advancement is made to Step S105. In the present embodiment, a case where the control signal inputted into the vehicle-side control portion 11 is not outputted from the driver input device 12 represents a case that the control signal is an outside control signal inputted from the vehicle-side communication portion 14. In other words, a case where the control signal inputted into the vehicle-side control portion 11 is not a control signal inputted from the driver input device 12 represents a case where the non-driving occupant makes an operation for the linked equipment device 18 via the terminal-side input device 24.

In Step S102, the operation acceptance portion F3 identifies the linked equipment device 18 the driver wishes to operate on the basis of the driver-side control signal and directs the identified linked equipment device 18 to perform processing corresponding to the driver-side control signal.

When the linked equipment device 18 identified in Step S102 performs the processing corresponding to the control signal and outputs the output data, the output data acquisition portion F5 acquires the output data in Step S103 and advancement is made to Step S104. The output data referred to herein includes image data (that is, the equipment image) and sound data correlated with the equipment image as mentioned in the description of the linked equipment device 18.

In Step S104, the output control portion F6 outputs the output data acquired in Step S103. The driver is notified of the information based on the output data, and the flow is ended. The notification represents update of the driver image displayed on the driver display 15 or a sound output from the sound output device 16 or both.

More specifically, when the output data acquisition portion F5 acquires the equipment image as the output data in Step S103, the driver display control portion F61 displays the equipment image on the driver display 15 by reflecting the acquired equipment image on the driver image. When the output data acquisition portion F5 acquires the output data including both of the equipment image and the sound data, the sound output control portion F62 controls the sound output device 16 to output a sound while the driver display control portion F61 controls the driver display 15 to display the equipment image by reflecting the acquired equipment image on the driver image.

When the layout of the driver image currently displayed includes the equipment image of the linked equipment device 18, the driver image is updated using an equipment image newly obtained in Step S113. When the layout of the driver image currently displayed does not include an image of the linked equipment device 18, the layout of the driver image is adjusted and a driver image including an equipment image newly obtained in Step S113 is generated and displayed.

The flow is ended in Step S105 after the output arbitration processing is called out. The output arbitration processing will be described using a flowchart of FIG. 5. The flowchart of FIG. 5 is started when advancement is made to Step S105 of FIG. 4.

Figure 5:
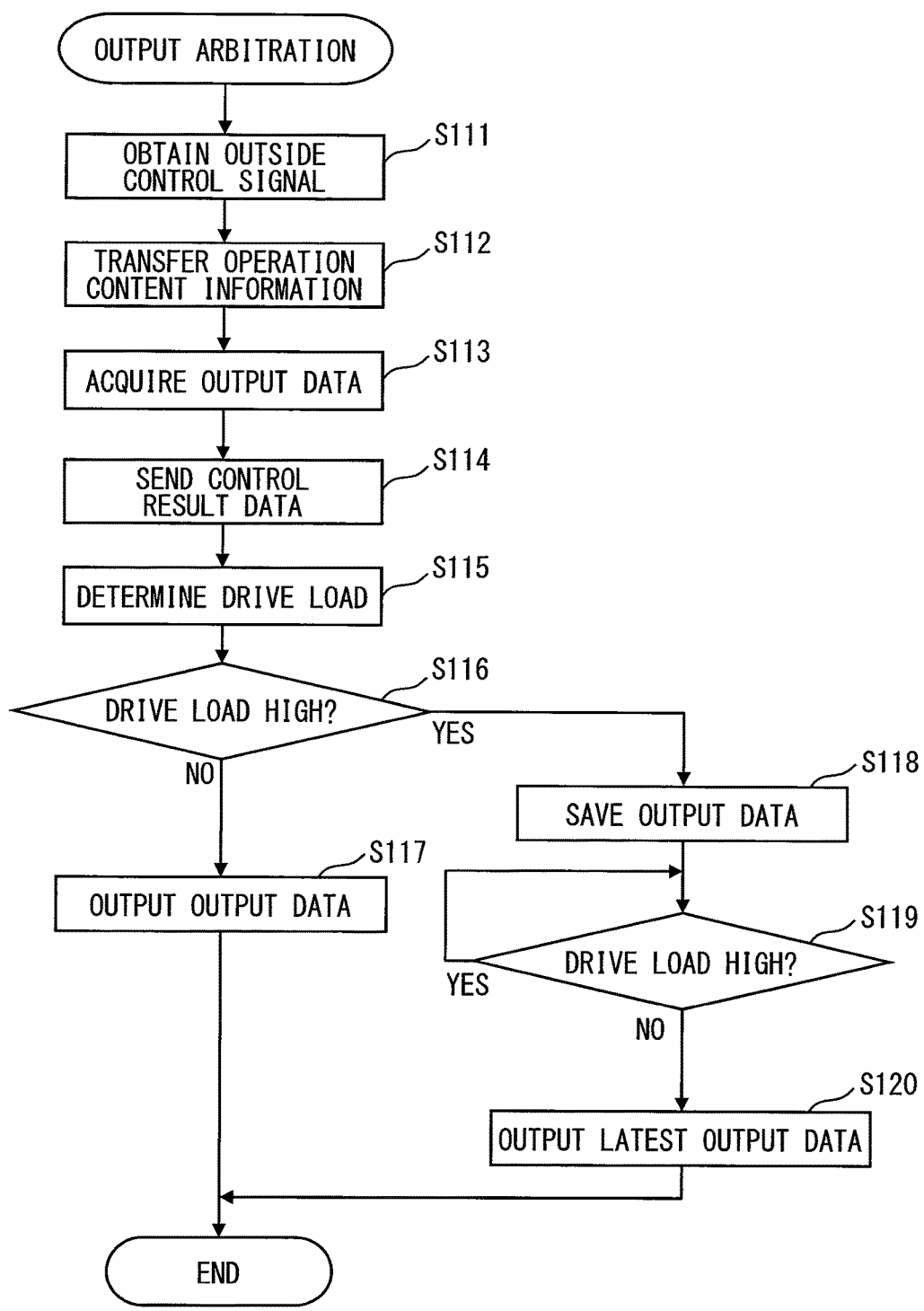
FIG. 5 is a flowchart illustrating output arbitration processing performed by the vehicle-side control portion.
Figure 7:
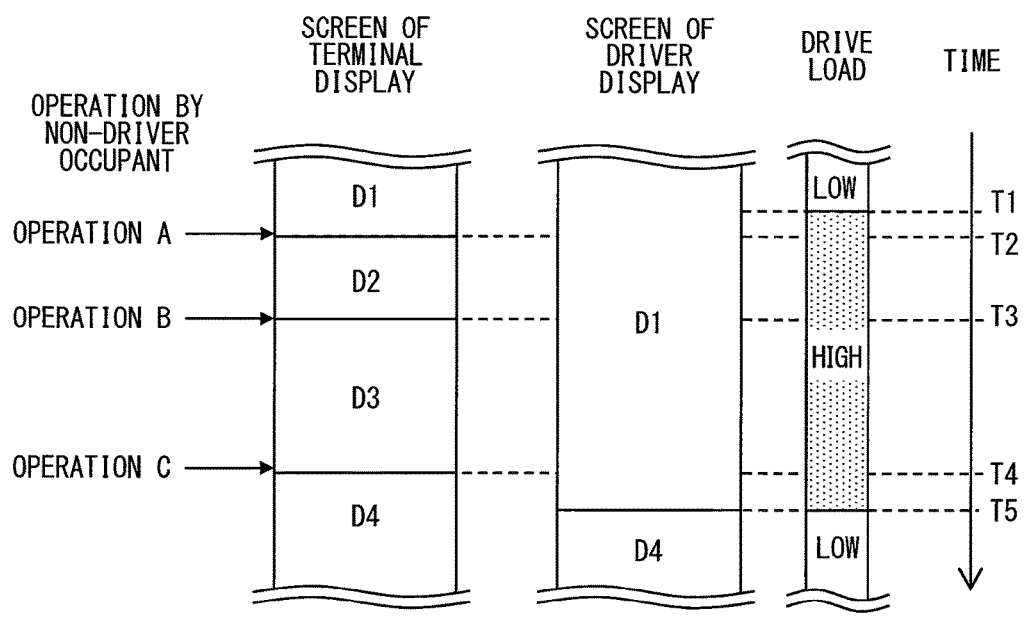
FIG. 7 is a diagram illustrating an operation of the vehicular notification control system of the first embodiment.

When the processing depicted by the flowchart of FIG. 5 and the processing depicted by the flowchart of FIG. 4 are performed in parallel, and even when the output arbitration processing in the flowchart of FIG. 5 is not completed, a flowchart of FIG. 7 is started successively (every 100 milliseconds). The multiple processing flows as above may be performed by a signal CPU by using a known task scheduling algorithm or performed in parallel by using multiple CPUs.

Firstly in Step S111, the operation acceptance portion F3 obtains an outside control signal and advancement is made to Step S112. In Step S112, the operation acceptance portion F3 identifies the linked equipment device 18 selected as the control target on the basis of the equipment ID of the linked equipment device 18 included in the outside control signal. The operation acceptance portion F3 subsequently outputs the operation content information including the screen ID and the touch position within the equipment image to the identified linked equipment device 18.

Upon input of the operation content information, the linked equipment device 18 determines a content of the user operation on the basis of the screen ID and the touch position within the equipment image, and performs processing corresponding to the user operation. Subsequently, the linked equipment device 18 outputs the output data to the vehicle-side control portion 11 in response to the user operation.

In Step S113, the output data acquisition portion F5 acquires the output data from the linked equipment device 18 and advancement is made to Step S114. In Step S114, the terminal output control portion F63 generates control result data including the equipment image the output data acquisition portion F5 acquired, the screen ID of the acquired equipment image, and the equipment ID of the linked equipment device 18, and sends the control result data to the portable terminal 20. When the equipment image is not included in the output data the output data acquisition portion F5 acquired in Step S113, the terminal output control portion F63 sends data indicating that the control is performed (or the control is not performed) as the control result data. When Step S114 is completed, advancement is made to Step S115.

In Step S115, the drive load determination portion F1 determines whether a drive load of the driver is high. When the drive load determination portion F1 determines that a drive load is high, a determination of YES is made in Step S116 and advancement is made to Step S118. When the drive load determination portion F1 does not determine that a drive load is high, a determination of NO is made in Step S116 and advancement is made to Step S117.

In Step S117, the output control portion F6 outputs the output data acquired in Step S113. The driver is notified of information based on the output data, and the flow is ended. For example, when the equipment image is obtained in Step S113, the output control portion F6 displays the equipment image on the driver display 15 by reflecting the equipment image on the driver image. When both of the equipment image and the sound data are obtained as the output data, the output control portion F6 controls the sound output device 16 to output a sound while controlling the driver display 15 to display the equipment image by reflecting the drive image on the driver image.

In Step S118, the output control portion F6 saves the output data acquired in Step S113 in the internal memory 111. More specifically, the output data is provided with a time stamp indicating a time when the output control portion F6 acquired the output data, and the output data is saved in the internal memory 111 while discriminating the linked equipment devices 18 corresponding to an acquisition source of the output data. The output data is provided with the time stamp, and saved in the internal memory 111 according to the linked equipment devices 18 depending on from which linked equipment device 18 the output data is acquired.

In Step S119, the drive load determination portion F1 determines whether a drive load of the driver is high. When the drive load determination portion F1 determines that a drive load is high, a determination of YES is made in Step S119 and the determination processing in Step S119 is repeated. When the drive load determination portion F1 determines that a drive load is not high, a determination of NO is made in Step S119 and advancement is made to Step S120.

The linked equipment device 18 may perform processing according to a newly inputted user operation while Step S119 is repeated and output new output data. In such a case, the output control portion F6 performs processing similar as the processing in Step S118 on the new output data and saves the new output data in the internal memory 111.

The non-driving occupant may make an instruction operation for multiple types of the linked equipment devices 18 after the drive load determination portion F1 has determined that a drive load is high in Step S116 and before the drive load determination portion F1 determines that a drive load is low in Step S119. In other words, the output data acquisition portion F5 may acquire the output data from multiple types of the linked equipment devices 18 after a determination of YES is made in Step S116 and before a determination of NO is made in Step S119.

In such a case, the output control portion F6 saves all items of the acquired output data in the internal memory 111 according to the linked equipment devices 18 depending on from which linked equipment device 18 each item of the output data is outputted. The internal memory 111 holds the output data the output data acquisition portion F5 acquired according to the linked equipment devices 18.

In Step S120, notification is made on the basis of the output data provided with a latest time stamp among all items of the output data saved in the internal memory 111, and the flow is ended.

When multiple items of the output data from multiple types of the linked equipment devices 18 are saved in the internal memory 111, the output data provided with a latest time stamp is outputted from each of the multiple types of the linked equipment devices 18.

For example, the driver display control portion F61 generates a driver image including the equipment image included in the latest output data in each of the multiple linked equipment devices 18 and displays the driver image thus generated on the driver display 15.

When the latest output data in each of the multiple linked equipment devices 18 is displayed on the driver display 15 concurrently and the sound data is included in more than one item of the output data, the sound output control portion F62 controls the sound output device 16 to output the sound data included in the latest output data among more than one item of the output data including the sound data.

Figure 6:
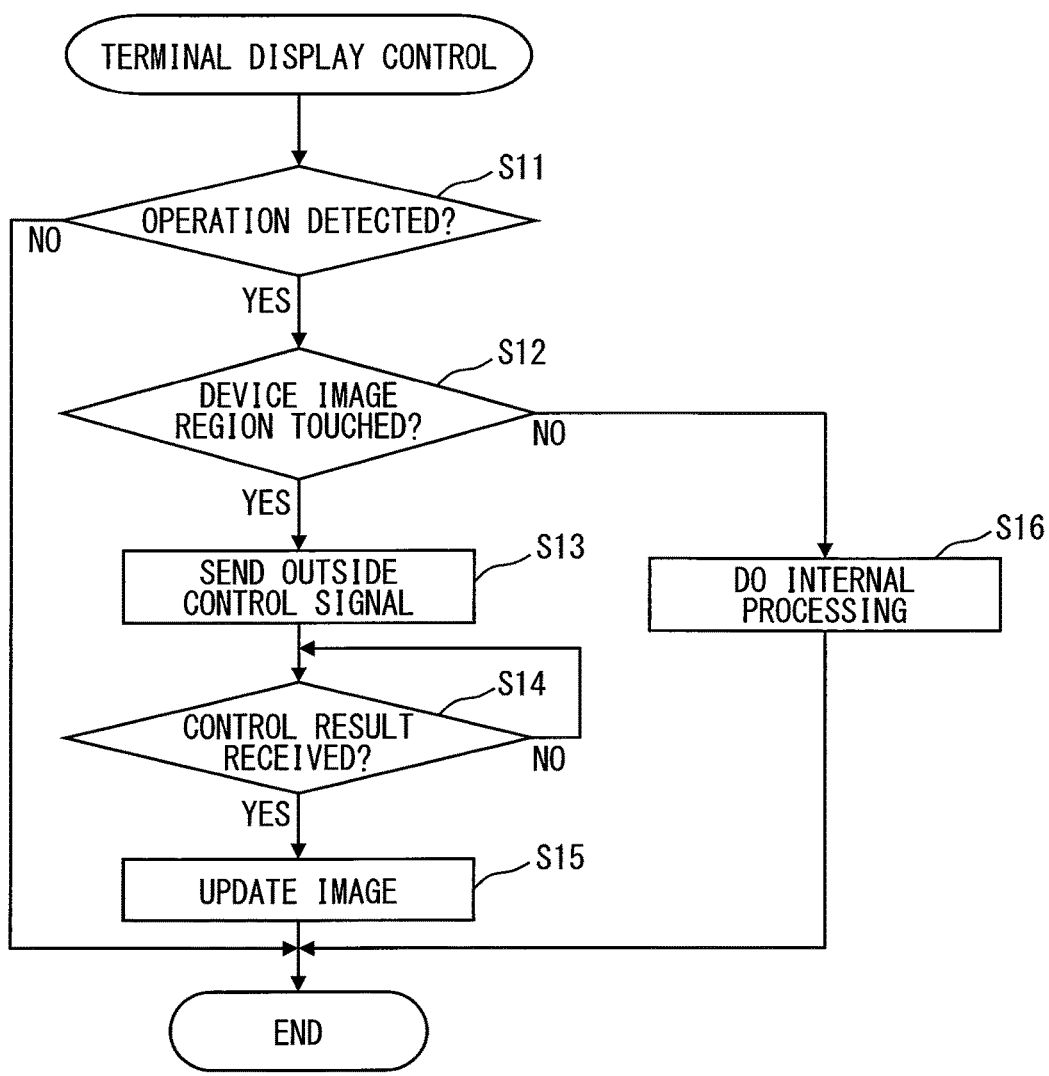
FIG. 6 is a flowchart illustrating terminal-side display control processing performed by the terminal-side control portion.

Processing (also referred to as a terminal-side display control processing) performed by the terminal-side control portion 21 to control an image displayed on the terminal-side display 23 according to a user operation will be described using a flowchart of FIG. 6. As one example, the flowchart of FIG. 6 may be performed successively (for example, every 40 milliseconds).

Firstly in Step S11, the terminal-side operation acceptance portion F83 determines whether the user made a touch operation on the terminal-side input device 24. Whether a touch operation is made is determined according to whether a touch-position signal is inputted from the terminal-side input device 24. That is to say, when a touch-position signal is inputted from the terminal-side input device 24, a determination of YES is made in Step S11 and advancement is made to Step S12. When a touch-position signal is not inputted from the terminal-side input device 24, a determination of NO is made in Step S11, and the flow is ended.

In Step S12, the terminal-side operation acceptance portion F83 determines whether the touch position by the user indicated by the touch-position signal is within the equipment image region. When the touch position touched by the user is within the equipment image region, a determination of YES is made in Step S12 and advancement is made to Step S13. When the touch position touched by the user is out of the equipment image region, a determination of NO is made in Step S12 and advancement is made to Step S16.

In Step S13, the terminal-side operation acceptance portion F83 generates an outside control signal and sends the outside control signal to the vehicle-side control portion 11 via the terminal-side communication portion 22 and the vehicle-side communication portion 14. The operation acceptance portion F3 of the vehicle-side control portion 11 performs series of the processing steps shown in FIG. 4 and FIG. 5 according to the outside control signal sent in Step S13. In Step S114 of FIG. 5, the terminal output control portion F63 of the vehicle-side control portion 11 sends the control result data in response to the user operation detected in Step S11 to the terminal-side control portion 21.

In Step S14, the terminal-side communication processing portion F81 determines whether the control result data is received from the vehicle-side control portion 11. When the control result data is received, a determination of YES is made in Step S14 and advancement is made to Step S15. The received control result data is stored in the internal memory 211. When the control result data is not received, a determination of NO is made in Step S14 and the terminal-side communication processing portion F81 stands by until the control result data is received by repeating Step S14.

In Step S15, the terminal-side display control portion F82 displays the equipment image included in the control result data newly received in Step S14 on the terminal-side display 23, and the flow is ended. In Step S16, internal processing corresponding to the touch position touched by the user is performed, and the flow is ended. For example, when the touch position is in a region where the switch button is displayed, the terminal-side display control portion F82 controls the terminal-side display 23 to display an equipment selection screen.

An operation of the vehicular notification control system 100 performing the output arbitration processing will be described using FIG. 7. FIG. 7 is a conceptual view showing a correlation between a state of a drive load determined by the drive load determination portion F1 upon acceptance of an instruction operation for the linked equipment device 18 by the non-driving occupant and transition of images displayed on the terminal-side display 23 and the driver display 15 at respective times. The equipment images of various linked equipment devices 18 and various types of vehicle information are displayed on the driver display 15. Images of linked equipment devices 18 other than the linked equipment device 18 selected as the control target are omitted in the portable terminal 20, for convenience. Operations A through C on the terminal-side input device 24 by the non-driving occupant in FIG. 7 are instruction operations for the linked equipment device 18 selected as the control target.

In an initial state, an equipment image D1 of the linked equipment device 18 selected as the control target in the portable terminal 20 is displayed on both of the terminal-side display 23 and the driver display 15.

The drive load determination portion F1 determines that a drive load of the driver is not high (that is, low) in the initial state. The drive load determination portion F1 later determines that a drive load of the driver becomes high at a time T1. The drive load determination portion F1 maintains the determination that a drive load of the driver is high until a time T5.

When the instruction operation A for the linked equipment device 18 is inputted by the non-driving occupant at a time T2 (Step S111), the vehicle-side control portion 11 outputs the operation content information indicating an operation content of the instruction operation A to the linked equipment device 18 (Step S112). The linked equipment device 18 performs processing according to the operation content information, and outputs the output data including an equipment image D2 to the vehicle-side control portion 11. The vehicle-side control portion 11 generates control result data on the basis of the output data and sends the control result data to the terminal-side control portion 21 (Step S114 of FIG. 5). The control result data includes the equipment image D2.

Since the drive load determination portion F1 determines at the time T2 that a drive load is high, a determination of NO is made in Step S116. Hence, the driver display control portion F61 does not display the equipment image D2 included in the output data on the driver display 15 and saves the output data in the internal memory 111 (Step S118).

Upon receipt of the control result data sent from the vehicle-side control portion 11 (Step S14: YES), the terminal-side control portion 21 displays the equipment image D2 included in the newly received control result data on the terminal-side display 23.

The non-driving occupant makes the linked equipment device 18 selected as the control target perform processing corresponding to the operations B and C by making the operations B and C, respectively, in accordance with equipment images D2 and D3 displayed on the terminal-side input devices 24. In a state in FIG. 7 at and after a time T4, the linked equipment device 18 performs processing corresponding to the operation C, and outputs the output data including an equipment image D4, so that the equipment image D4 is displayed on the terminal-side display 23.

Since the determination that a drive load of the driver is high is maintained until the time T5, the driver display control portion F61 saves the equipment image D3 outputted at the time T3 from the linked equipment device 18 in the internal memory 111 and does not display the equipment image D3 on the driver display 15. The equipment image D4 outputted at the time T4 from the linked equipment device 18 is handled in a manner similar as the equipment images D3 and D2.

At timing (time T5) at which the drive load determination portion F1 determines that a drive load is low, the latest equipment image D4 among the equipment images D2 through D4 saved in the internal memory 111 is outputted to the driver display 15 (Step S120).

FIG. 7 describes an operation when notification is made via the driver display 15 as notification to the driver, and does not describe notification via the sound output device 16. Hereinafter, an operation when the output data the output data acquisition portion F5 acquired includes sound data will be described using FIG. 7.

For example, assume that sound data is included in the output data outputted from the linked equipment device 18 to the vehicle-side control portion 11 at the respective times T2, T3, and T4 in response to operations made by the non-driving occupant at the corresponding times.

As has been described above, the output data the output data acquisition portion F5 acquires while the drive load determination portion F1 determines that a drive load is high is outputted neither to the driver display 15 nor the sound output device 16, and the output data is saved in the internal memory 111. When the drive load determination portion F1 determines at the time T5 that a drive load is not high, the output control portion F6 makes notification on the basis of the latest output data among all items of the output data stored in the internal memory 111. In other words, the output control portion F6 makes notification on the basis of the output data outputted from the linked equipment device 18 in response to the operation C made at the time T4 by the non-driving occupant.

No notification is made on the basis of the output data outputted from the linked equipment device 18 in response to the operations A and B made, respectively, at the times T2 and T3 by the non-driving occupant. Hence, the sound data included in such output data is not outputted from the sound output device 16. The sound data outputted in the situation shown in FIG. 7 is the sound data included in the output data outputted from the linked equipment device 18 in response to the operation C made at the time T4 by the non-driving occupant.

Even in a case where the sound data is not included in the output data outputted from the linked equipment device 18 in response to the operation C by the non-driving occupant, the sound data included in the output data outputted from the linked equipment device 18 in response to the second latest operation B is not outputted as a sound from the sound output device 16.

Suppose that sound data included in the output data outputted from the linked equipment device 18 in response to the second latest operation B is outputted. Then, information shown by the equipment image displayed on the driver display 15 is not consistent with information informed by a sound outputted from the sound output device 16. The driver becomes even more confused when the information shown by the equipment image displayed on the driver display 15 and information outputted as a sound from the sound output device 16 are not consistent with each other. However, according to the configuration of the present embodiment, it may be possible to avoid inconsistency between information shown by the equipment image displayed on the driver display 15 and information outputted as a sound from the sound output device 16.

Summary of Embodiment

According to the configuration described above, when the output data is outputted from the linked equipment device 18 due to an operation made by the non-driving occupant while the drive load determination portion F1 determines that a drive load of the driver is high, no notification is made on the basis of such output data and the output data is saved in the internal memory 111. Notification is made on the basis of the output data saved in the internal memory 111 at timing at which the drive load of the driver becomes low. In other words, an equipment image included in the output data is displayed on the driver display 15 and sound data is outputted as a sound when the sound data is included in the output data.

A state in which a drive load is high is a state in which the driver needs to concentrate more intensely on a drive operation. A state in which a drive load is not high is a state in which the driver is relaxed in making a drive operation. When the driver is relaxed in making a drive operation, notification (changing a display image or outputting a sound) made due to an operation by the occupant other than the driver is less likely to prevent a drive operation by the driver. In other words, it can be said that a case where notification made due to an operation by the occupant other than the driver becomes a hindrance to a drive operation by the driver is a case where a drive load of the driver is high.

According to the configuration as above, notification due to an operation by the non-driving occupant is not made when a drive load is high. Hence, a probability that a drive operation by the driver is hindered by an operation made by the occupant other than the driver can be reduced.

While the drive load determination portion F1 determines that a drive load of the driver is not high, the output data acquired from the linked equipment device 18 due to an operation made by the non-driving occupant is outputted from the driver display 15 or the sound output device 16 whenever necessary. In other words, when the driver is relaxed in making a drive operation, the output control portion F6 outputs the output data the output data acquisition portion F5 acquired whenever necessary.

Hence, while the drive load determination portion F1 determines that a drive load of the driver is not high, the driver is able to know a content of an operation made by the non-driving occupant and a present control state of the linked equipment device 18 in real time as the driver sees the equipment image displayed on the driver display 15 or hears a sound outputted from the sound output device 16.

While the embodiment of the present disclosure has been described, it should be appreciated that the present disclosure is not limited to the embodiment above, and modifications and embodiments below are also within the technical scope of the present disclosure. Further, the present disclosure can be implemented in various manners within the scope of the present disclosure besides the modifications and the embodiments below.

For example, the above has described the configuration in which at least image data is included in the output data. However, the present disclosure is not limited to this configuration. The output data may include sound data alone. In such a case, when the latest output data outputted in Step S120 is the sound data and an equipment image obtained earlier is saved in the internal memory 111, the equipment image may be displayed on the driver display 15.

Second Embodiment

A second embodiment of the present disclosure will be described using the drawings. Hereinafter, members furnished with same functions as the members shown in the drawings used in the description of the first embodiment are labeled with the same reference numerals and a description is not repeated. When only a part of the configuration is described, the description in the first embodiment applies to the other parts of the configuration.

Figure 8:
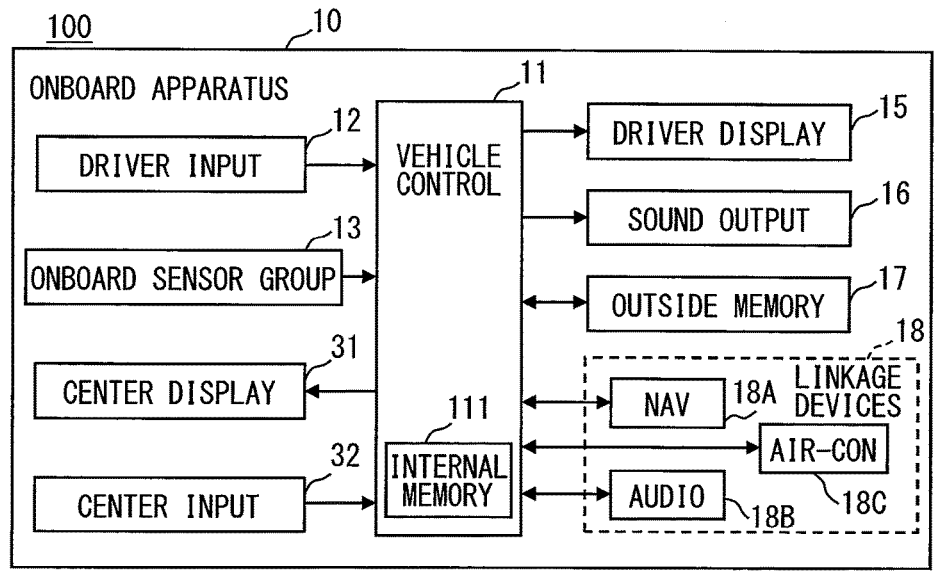
FIG. 8 is a block diagram showing an example of a schematic configuration of a vehicular notification control system according to a second embodiment.

A vehicular notification control system 100 of the second embodiment is different from the counterpart of the first embodiment in that a portable terminal 20 is not included. Accordingly, a vehicle onboard apparatus 10 of the second embodiment does not necessarily require a vehicle-side communication portion 14. Hence, the vehicle-side communication portion 14 can be omitted as shown in FIG. 8. It should be noted that the vehicle onboard apparatus 10 includes a center display 31 and a center input device 32 as additional elements in comparison with the vehicle onboard apparatus 10 of the first embodiment. Configurations of the additional elements will be described more concretely in the following.

The center display 31 is a display to notify a driver of various types of information by displaying a text and an image according to an instruction from a vehicle-side control portion 11 and disposed to an instrument panel in the vicinity of a center in a vehicle width direction. In other words, the center display 31 is a display disposed at a visually recognizable position not only for a driver but also for a non-driving occupant. Hence, the non-driving occupant is also able to confirm various types of information by looking an image displayed on the center display 31. The center display 31 corresponds to a non-driving occupant display of the present disclosure.

The center display 31 is, for example, a full-color display and can be a liquid crystal display, an organic EL display, a plasma display, or the like. Alternatively, the center display 31 may not be a full-color display or may display only a text indicating a set temperature and an operation mode of an air-conditioning equipment device 18C.

The center input device 32 is, for example, a mechanical switch disposed on the periphery of the center display 31. The center input device 32 includes multiple switches, and each switch is assigned with processing that can be performed by the linked equipment devices 18. When any of the switches is depressed by the user, the center input device 32 outputs a control signal (also referred to as a center-side control signal) corresponding to the depressed switch to the vehicle-side control portion 11. The center input device 32 corresponds to one example of the input device of the present disclosure.

By operating the center input device 32, the non-driving occupant is able to direct, for example, an audio equipment device 18B linked to the vehicle-side control portion 11 when the non-driving occupant selects a song or an album which he/she wishes to play, plays or stops a song, and adjusts a volume. The non-driving occupant is also able to control a navigation equipment device 18A and an air-conditioning equipment device 18C to perform control contents as the non-driving occupant wishes by operating the center input device 32.

The center input device 32 and a driver input device 12 input control signals into the vehicle-side control portion 11 by using different channels. The vehicle-side control portion 11, which receives inputs of control signals according to user operations from both of the driver input device 12 and the center input device 32, is capable of determining which control signal is outputted from which input device on the basis of the channel via which the control signal is inputted. The vehicle-side control portion 11 is capable of distinguishing a control signal outputted from the driver input device 12 and a control signal outputted from the center input device 32 from each other on the basis of the channel via which the control signal is inputted.

In the present embodiment, mechanical switches are adopted as the center input device 32. It should be appreciated that the center input device 32 is not limited to mechanical switches. The center input device 32 may be a touch panel provided integrally with the center display 31 or a known haptic device.

Figure 9:
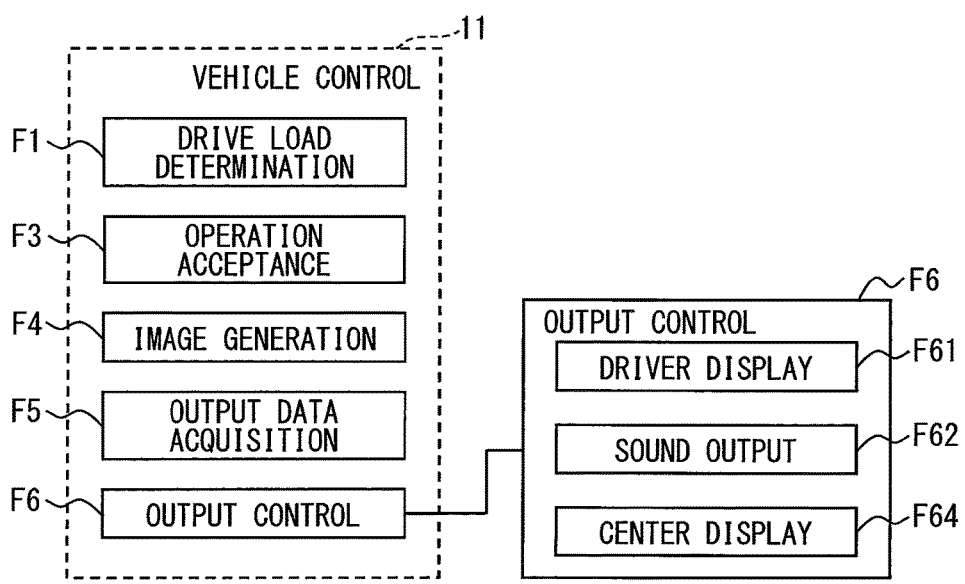
FIG. 9 is a block diagram showing an example of a schematic configuration of a vehicle-side control portion included in a vehicle onboard apparatus of the second embodiment.

As is shown in FIG. 9, the vehicle-side control portion 11 includes a drive load determination portion F1, an operation acceptance portion F3, a vehicle information image generation portion F4, an output data acquisition portion F5, and an output control portion F6 as functional blocks. Each functional block fundamentally performs processing in the similar manner as the counterparts included in the vehicle-side control portion 11.

It should be noted that the operation acceptance portion F3 accepts a signal outputted from the center input device 32 (that is, corresponding to a center control signal) instead of the outside control signal from the portable terminal 20. Upon receipt of a center control signal, the operation acceptance portion F3 identifies a linked equipment device 18 the user wishes to operate on the basis of the received center control signal and directs the identified linked equipment device 18 to perform processing corresponding to the control signal. An instruction operation corresponding to the center control signal herein corresponds to an instruction operation by the non-driving occupant of the present disclosure.

The output control portion F6 includes a center display control portion F64 instead of the terminal output control portion F63. The center display control portion F64 controls the center display 31 to display an equipment image the output data acquisition portion F5 acquired whenever necessary. The center display control portion F64 corresponds to a non-driving occupant display control portion of the present disclosure.

With the configuration as above, the vehicle-side control portion 11 performs output control related processing (see FIG. 4) and output arbitration processing (see FIG. 5) similar as the corresponding processing in the first embodiment. It should be noted that the center control signal corresponds to the outside control signal.

The driver may operate the center input device 32. However, it is least likely that the driver who is making a drive operation operates the center input device 32. Hence, it can be assumed that it is the non-driving occupant who makes an operation on the center input device 32 while the vehicle is running. The operation acceptance portion F3 determines that the center control signal inputted while the vehicle is running is inputted due to an operation by the non-driving occupant (Step S101: NO).

In Step S114 of the output arbitration processing of the second embodiment, when the output data acquisition portion F5 acquires an equipment image as output data in S113, the center display control portion F64 controls the center display 31 to display the equipment image, and advancement is made to Step S115. When the output data acquisition portion F5 does not acquire an equipment image as the output data in Step S113, advancement is made directly to Step S115.

An operation in the second embodiment is as follows. That is, in a case where an equipment image is outputted from the linked equipment device 18 due to an operation by the non-driving occupant while the drive load determination portion F1 determines that a drive load of the driver is high, the output data is outputted to neither a driver display 15 nor a sound output device 16, and saved in an internal memory 111. The latest equipment image is displayed on the driver display 15 at timing at which a drive load of the driver becomes low. The center display control portion F64 controls the center display 31 to display an equipment image obtained from the linked equipment device 18 whenever necessary.

Effects similar as the effects of the first embodiment can be achieved also by the configuration of the second embodiment. The non-driving occupant is able to input various instructions for the linked equipment devices 18 by looking an equipment image displayed on the center display 31.

Third Embodiment

In the first embodiment, each linked equipment device 18 draws an image corresponding to a result of the processing the linked equipment device 18 has performed by itself. The driver display control portion F61 and the terminal-side display control portion F82 control the corresponding displays to display the image drawn by the linked equipment device 18. It should be appreciated that the present disclosure is not limited to the configuration as above.

A linked equipment device 18 of the third embodiment outputs data (also referred to as an image generation data) to a vehicle-side control portion 11 for a driver display control portion F61 and for a terminal-side display control portion F82 to generate an image corresponding to a control state. Hence, the driver display control portion F61 and the terminal-side display control portion F82 generate an image (referred to as an equipment-compatible image) to be displayed on the corresponding displays on the basis of the image generation data. The image generation data corresponds to image generation information of the present disclosure.

For example, since the linked equipment device 18 requests displaying of various screens, format data specifying a layout of each screen is correlated with screen IDs and stored in an internal memory 111 according to the linked equipment devices 18. The format data may include background images, positions of various buttons displayed on the screens, and button IDs as identifiers unique to the buttons.

It is sufficient for the image generation data inputted from the linked equipment device 18 to include a screen ID and data of various texts to be displayed on the screen. In the case of a screen corresponding to song play processing by an audio equipment device 18B (also referred to as a song play screen), the text data to be displayed on the screen includes a title of a song to be played, a title of the album that contains the song, a play or stop state, and a volume.

The driver display control portion F61 identifies format data corresponding to the image generation data inputted from the linked equipment device 18 on the basis of the screen ID included in the inputted image generation data. The driver display control portion F61 generates an equipment-compatible image on the basis of the format data and the text data included in the image generation data.

According to this configuration, a degree of freedom of a layout of a driver image can be increased and an equipment-compatible image in a layout fit to the driver display 15 can be displayed on the driver display 15.

The vehicle-side control portion 11 (chiefly, the terminal output control portion F63) of the third embodiment provides a terminal-side control portion 21 with control result data including the image generation data acquired from the linked equipment device 18 instead of an equipment image generated in the linked equipment device 18. A terminal-side display control portion F82 thus draws an image to be displayed on the terminal-side display 23 (that is, equipment-compatible image) on the basis of the image generation data.

In other words, format data of each screen of the respective linked equipment devices 18 is stored also in the internal memory 211. The terminal-side display control portion F82 thus draws an equipment-compatible image corresponding to a control state of the linked equipment device 18 that has outputted image generation data by using the image generation data transferred from the vehicle onboard apparatus 10 and the format data stored in the internal memory 211.

According to the configuration as above, the terminal-side display control portion F82 is also capable of controlling the terminal-side display 23 to display an equipment-compatible image fit to a screen size of the terminal-side display 23.

A terminal-side operation acceptance portion F83 of the third embodiment identifies a button the user has selected on the basis of a touch position, and further determines a control content corresponding to the selected button. The terminal-side operation acceptance portion F83 subsequently returns a request signal requesting the linked equipment device 18 to perform the determined control content to the vehicle onboard apparatus 10 as the outside control signal.

Figure 10:
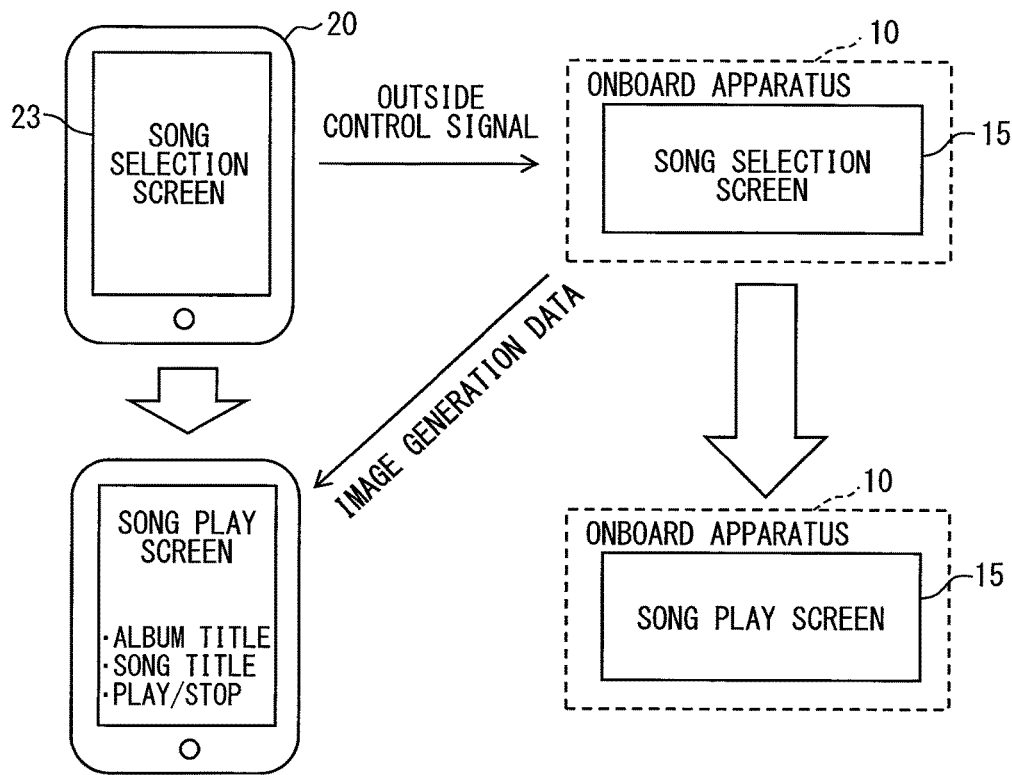
FIG. 10 is a diagram illustrating an operation of a vehicular notification control system according to a third embodiment.

An operation in the third embodiment will be described using FIG. 10. FIG. 10 shows an example where display screens on both of the driver display 15 and the terminal-side display 23 are a song selection screen to let the user select a song which the user wishes to play. In a situation shown in FIG. 10, when a song as a target of play processing is selected by the non-driving occupant via a terminal-side input device 24, a portable terminal 20 outputs an outside control signal requesting the linked equipment device 18 to play the selected song to the vehicle onboard apparatus 10.

Upon receipt of the outside control signal sent from the portable terminal 20, the vehicle-side control portion 11 directs an audio equipment device 18B to play the song the user has selected according to the outside control signal. As a result of the processing, the vehicle-side control portion 11 acquires image generation data to display a song play screen from the audio equipment device 18B. The image generation data includes data indicating a title of the album containing the song the user has selected, a title of the song, a start or stop state, and a volume.

Figure 11:
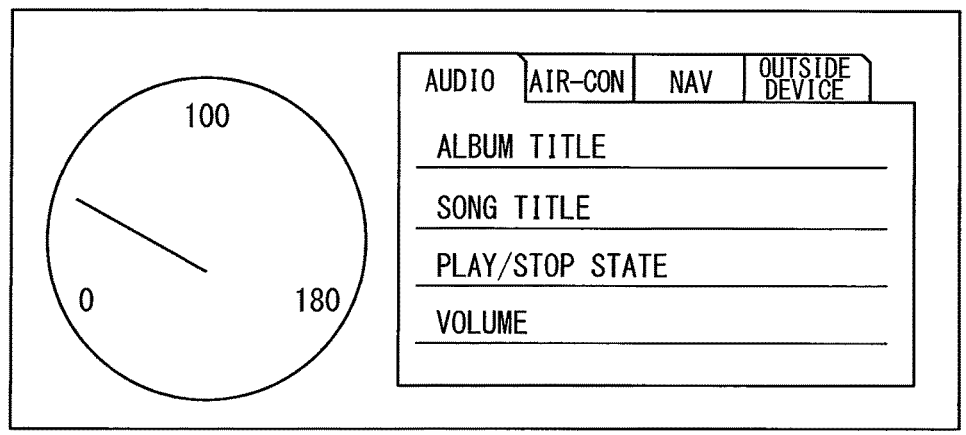
FIG. 11 is a diagram illustrating an example of a song play screen displayed on a driver display.

The driver display control portion F61 controls the driver display 15 to display a song play screen as shown in FIG. 11 as an example on the basis of the image generation data while the terminal output control portion F63 sends the image generation data to the portable terminal 20. The terminal-side display control portion F82 of the portable terminal 20 draws image data to be displayed as a song play screen on the basis of the image generation data sent from the vehicle onboard apparatus 10, and switches the song selection screen to the song play screen.

A series of the processing steps shown in FIG. 10 as an example is processing triggered by an operation by the non-driving occupant. Hence, the vehicle-side control portion 11 performs output arbitration processing when a determination of NO is made in step S101 of FIG. 4 upon input of the outside control signal. Display screens on the driver display 15 are switched and a sound is outputted when a drive load of the driver becomes low.

The above has described a case where the format data used to draw an image is stored with the image generation data in the internal memory 111 and the internal memory 211. It should be appreciated that the format data is not necessarily stored as described above. Data corresponding to the format data may be included in the image generation data. For example, the image generation data may be shown by a known representation method of specifying a layout of sentences and images within a screen such as HTML.

Further, each linked equipment device 18 may send control state data indicating a present control state to the vehicle-side control portion 11 or the terminal-side control portion 21 to enable the vehicle-side control portion 11 and the terminal-side control portion 21 to draw an image corresponding to the control state indicated by the control state data. For example, data (a control state-image correspondence data) indicating a correlation of various control states of the respective linked equipment devices 18 and equipment-compatible images displayed in the respective control states is saved in the internal memory 111 and the internal memory 211. Upon acquisition of the control state data, the vehicle-side control portion 11 and the terminal-side control portion 21 control the corresponding displays to display an equipment-compatible image corresponding to the control state indicated by the acquired control state data by referring to the control state-image correspondence data.

Fourth Embodiment

The above has described a configuration in which the portable terminal 20 plays a role of the input device to accept a user operation and also the display device to show the control states of the linked equipment devices 18. It should be appreciated that the portable terminal 20 in itself may be furnished with a navigation function equivalent to the navigation equipment device 18A and an audio function equivalent to the audio equipment device 18B. The portable terminal 20 in itself may be deemed as a single linked equipment device for the vehicle onboard apparatus 10. A fourth embodiment will describe such a configuration by using FIG. 12 and FIG. 13.

Figure 12:
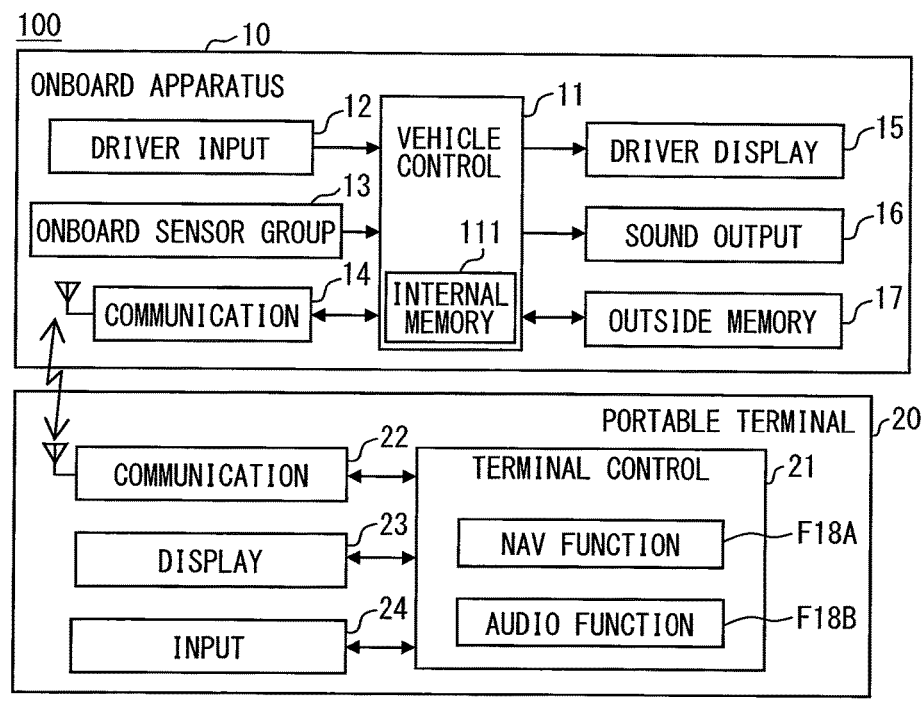
FIG. 12 is a block diagram showing an example of a schematic configuration of a vehicular notification control system according to a fourth embodiment.

FIG. 12 is a block diagram showing a schematic configuration of a vehicular notification control system 100 of the fourth embodiment. As is shown in FIG. 12, a terminal-side control portion 21 of the fourth embodiment includes a navigation function portion F18A equivalent to the navigation equipment device 18A described above and an audio function portion F18B equivalent to the audio equipment device 18B described above. Although it is not shown in FIG. 12, the terminal-side control portion 21 of the fourth embodiment includes the internal memory 211, the terminal-side communication processing portion F81, the terminal-side display control portion F82, and the terminal-side operation acceptance portion F83 shown in FIG. 1.

The navigation function portion F18A and the audio function portion F18B may be realized by running application programs corresponding to the respective functions and stored in the internal memory 211 on a CPU. The navigation function portion F18A performs various types of processing (for example, route guidance processing) according to a user operation accepted at the terminal-side operation acceptance portion F83 or an operation acceptance portion F3 and also requests the terminal-side display control portion F82 to display a screen corresponding to a result of the processing.

As with the navigation function portion F18A, the audio function portion F18B also performs various types of processing (for example, song play processing) according to a user operation accepted at the terminal-side operation acceptance portion F83 or the operation acceptance portion F3, and also requests the terminal-side display control portion F82 to display a screen corresponding to a result of the processing. The terminal-side display control portion F82 draws an image according to the request from the navigation function portion F18A or the audio function portion F18B and controls the terminal-side display 23 to display the image thus drawn.

Many operations are relatively common in the navigation function portion F18A and the audio function portion F18B when an operation of the vehicular notification control system 100 of the fourth embodiment is described. Hence, a description of one function portion can be applied to the other function portion and the audio function portion F18B will be described concretely herein, for convenience.

When the audio function portion F18B performs processing according to a user operation, the audio function portion F18B requests the terminal-side display control portion F82 to switch display screens and provides the terminal-side communication processing portion F81 with output data including at least one of image generation data and sound data with a request to send the output data to the vehicle onboard apparatus 10. Hence, the terminal-side communication processing portion F81 sends the output data to the vehicle onboard apparatus 10 according to the request.

The image generation data used herein is similar as the image generation data described in the third embodiment above. More specifically, the image generation data is data for a driver display control portion F61 to display a screen showing a result of the processing the audio function portion F18B performed according to the user operation and corresponding to a present control state of the audio function portion F18B on a driver display 15. Sound data included in the output data is sound data to be outputted from a sound output device 16 and includes song data, an operation sound, a speech dialog of speech recognition, an automatic mail reading voice, and so on.

The output data sent from a portable terminal 20 is acquired by the output data acquisition portion F5 via a vehicle-side communication portion 14 and a vehicle-side communication processing portion F2. When the image generation data is included in the output data, the driver display control portion F61 generates a display image by drawing an equipment-compatible image on the basis of the image generation data and combining the equipment-compatible image with a vehicle information image. The combined image thus obtained is displayed on the driver display 15. When sound data is included in the output data, the sound output control portion F62 inputs the sound data into the sound output device 16 for the sound data to be outputted as a sound.

The operation acceptance portion F3 obtains an instruction operation by the driver for the audio function portion F18B inputted via the driver input device 12. The vehicle-side communication portion F2 sends a control signal corresponding to the driver operation to the portable terminal 20. Upon obtaining the control signal sent from the vehicle onboard apparatus 10, the portable terminal 20 performs processing corresponding to the obtained control signal and switches display screens and sends the output data.

That is to say, even when the audio function portion F18B equivalent to the audio equipment device 18B is furnished to the portable terminal 20, the function can be operated by the driver as well as by the non-driving occupant. The above has described an operation of the audio function portion F18B in detail as an example. It should be appreciated that the same applies to the navigation function portion F18A.

Figure 13:
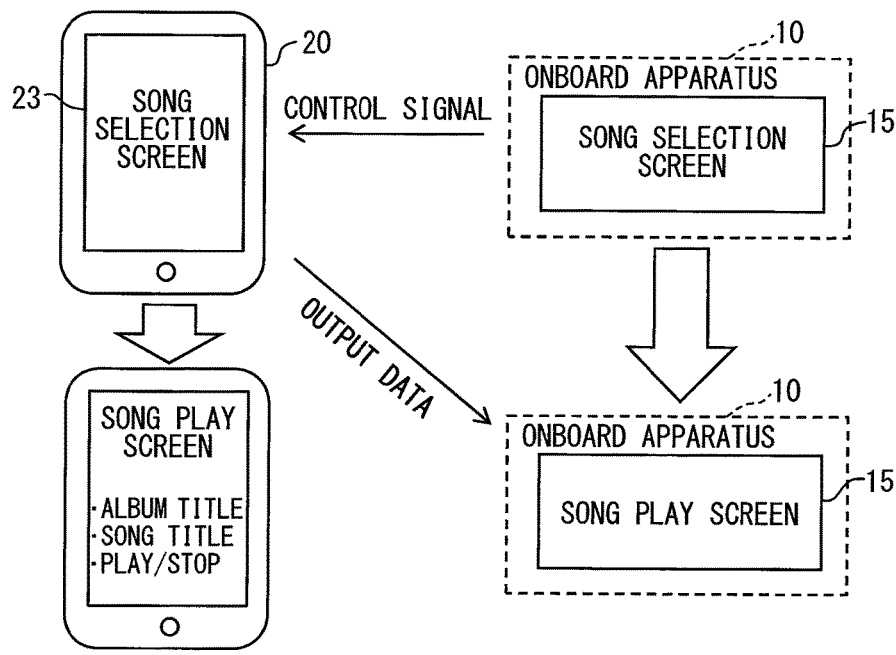
FIG. 13 is a diagram illustrating an operation of the vehicular notification control system of the fourth embodiment.

Operations of the vehicle onboard apparatus 10 and the portable terminal 20 of the fourth embodiment will be described using FIG. 13. FIG. 13 shows a situation where display screens of both of the driver display 15 and the terminal-side display 23 are a song selection screen as an example. In the situation shown in FIG. 13, when the driver selects a song which the driver wishes to play by operating the driver input device 12, the vehicle onboard apparatus 10 sends a control signal to the portable terminal 20 directing to play the song the driver has selected.

Upon obtaining the control signal sent from the vehicle onboard apparatus 10, the portable terminal 20 switches the display screen to a song play screen for the selected song and sends image generation data to draw the song play image to the vehicle onboard apparatus 10. The portable terminal 20 also obtains sound data corresponding to the song data by staring the song play processing for the selected song and sends the obtained sound data to the vehicle onboard apparatus 10.

The vehicle onboard apparatus 10 draws an equipment-compatible image on the basis of the image generation data sent from the portable terminal 20 and switches the screen of the driver display 15 from the song selection screen to a song play screen (see FIG. 11). Further, the vehicle onboard apparatus 10 controls the sound output device 16 to output sound data sent from the portable terminal 20.

The above has described a series of operations of the portable terminal 20 and the vehicle onboard apparatus 10 triggered by an operation by the driver. A series of operations of the portable terminal 20 and the vehicle onboard apparatus 10 triggered by an operation by the non-driving occupant will be described.

In the situation shown in FIG. 13, when the non-driving occupant selects a song which he/she wishes to play by operating the terminal-side input device 24, the portable terminal 20 switches the display screen to a song play screen for the song the user has selected and also sends image generation data to draw the song play screen to the vehicle onboard apparatus 10. Further, the portable terminal 20 starts the song play processing for the selected song.

Upon acquisition of the image generation data or the sound data, the vehicle onboard apparatus 10 performs a series of processing steps corresponding to the output control related processing described above. It should be noted that a series of operations of the portable terminal 20 and the vehicle onboard apparatus 10 herein is processing triggered by an operation by the non-driving occupant. Hence, the driver display control portion F61 and the sound output control portion F62 do not output the output data and withholds the output data until the drive load determination portion F1 determines that a drive load is low.

In other words, notification on the basis of the output data acquired from the portable terminal 20 such as switching the display screens of the driver display 15 and outputting a sound is withheld when a drive load of the driver is high and made later when a drive load becomes low.

In the fourth embodiment, whether an event such as switching of display screens of the driver display 15 and an output of a sound is triggered by an operation by the driver or by an operation by the non-driving occupant may be determined by a cooperation of respective portions in the vehicle-side control portion 11.

For example, when the output data such as the image generation data (or sound data) is acquired even when a control signal from the driver input device 12 is not accepted within a predetermined time (for example, one second) the vehicle-side control portion 11 may determine that an operation is made by the non-driving occupant.

Alternatively, when the terminal-side operation acceptance portion F83 accepts an input operation on the terminal-side input device 24, the portable terminal 20 may send a signal informing the acceptance of an operation by the non-driving occupant to the vehicle onboard apparatus 10. When configured as above, the vehicle-side control portion 11 may determine that an operation by the non-driving occupant is made when the acceptance informing signal is obtained from the portable terminal 20.

Fifth Embodiment

The above has described a case where the navigation function, the audio function, and the air-conditioning function are the functions available to the user in the vehicle interior. It should be appreciated that the available functions are not limited to the functions specified above. In the configuration where the vehicle onboard apparatus 10 includes the portable terminal 20 as a linked equipment device as described in the fourth embodiment above as an example, various functions furnished to the portable terminal 20 may be made available to the user via the vehicle onboard apparatus 10.

Various functions furnished to the portable terminal 20 include, for example, a mail reading function of reading a mail received at the portable terminal 20, a web search function of searching for data on a web using a search term picked up by speech recognition, and a weather forecast function of providing the user with weather forecast information in addition to the navigation function and the audio function described above. The functions specified above are mere examples and the portable terminal 20 is not necessarily furnished with all of the specified functions. Further, a function other than the functions specified above may be made available to the user in the vehicle interior via the vehicle onboard apparatus 10.

A series of processing steps when weather forecast information is displayed on a driver display 15 according to an operation by the driver on a driver input device 12 will be described using FIG. 14 as an example.

Figure 14:
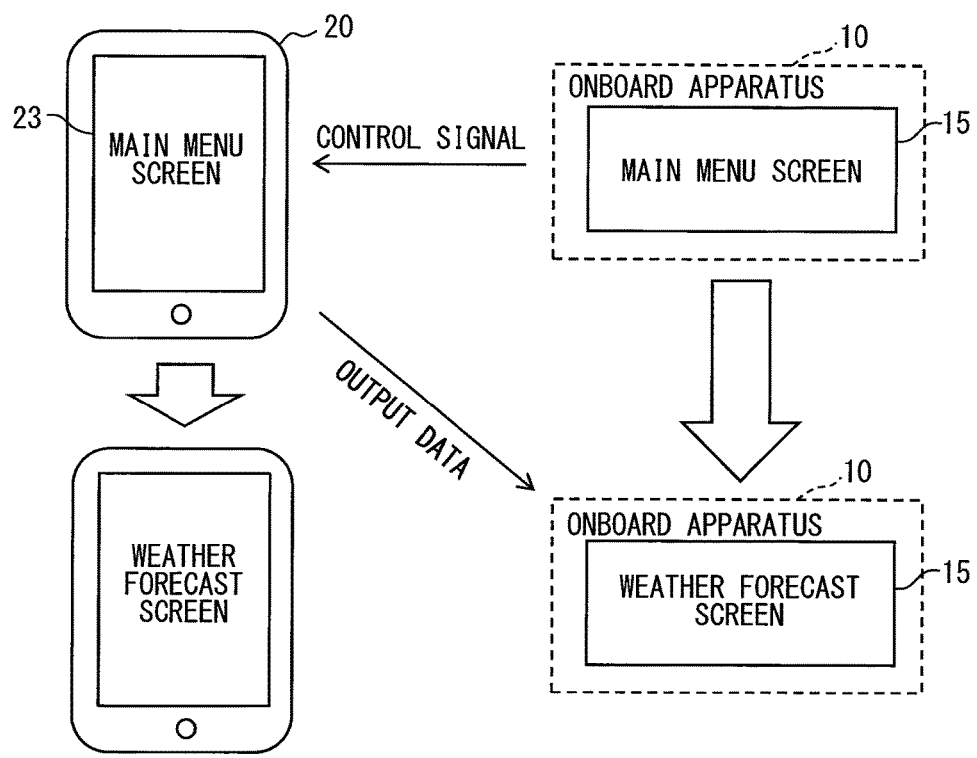
FIG. 14 is a diagram illustrating an operation of a vehicular notification control system according to a fifth embodiment.

FIG. 14 shows a situation where display screens of both of the driver display 15 and a terminal-side display 23 are a screen (main menu screen) to let the user select a function the user wishes to use among the functions available to the user in the vehicle interior. In the situation of FIG. 14, when the driver selects the weather forecast function by operating the driver input device 12, the vehicle onboard apparatus 10 sends a signal (weather forecast requesting signal) requesting sending of the weather forecast information to the portable terminal 20.

Upon receipt of the weather forecast request signal, the portable terminal 20 acquires the weather forecast information from an outside server via a known wide area communication network and displays a weather forecast screen showing the weather forecast information on the terminal-side display 23. At the same time, the portable terminal 20 returns the weather forecast information to the vehicle onboard apparatus 10 as output data.

Figure 15:
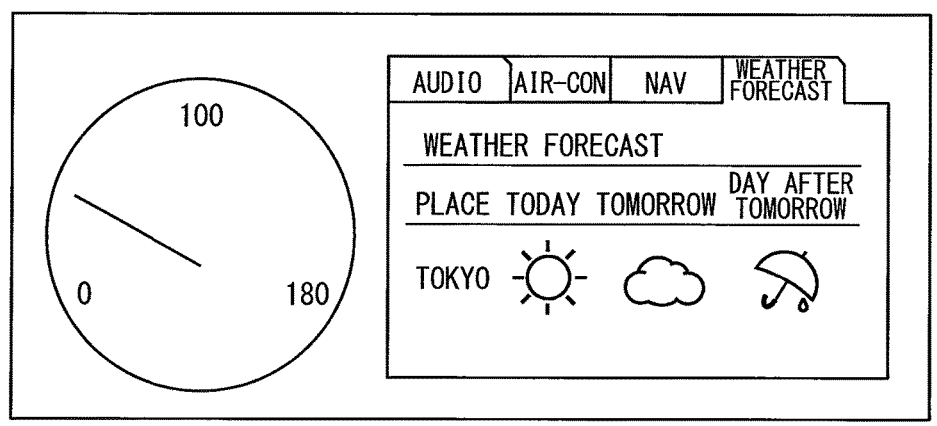
FIG. 15 is a diagram illustrating an example of a weather forecast screen displayed on the driver display.

Upon acquisition of the weather forecast information from the portable terminal 20, the vehicle onboard apparatus 10 displays a weather forecast screen, for example, as shown in FIG. 15 on the basis of the obtained weather forecast information.

As has been described in the fourth embodiment and the fifth embodiment above, functions available to the user in the vehicle interior are not limited to functions provided by equipment device installed to the vehicle and may be functions provided by equipment device brought into the vehicle interior by the user. Also, functions available to the user in the vehicle interior are not limited to the navigation function, the audio function, and the air-conditioning function, and may be various functions realized by application programs installed to the portable terminal 20.

In the fourth embodiment and the fifth embodiment above, the portable terminal 20 sends the image generation data as the output data and the driver display control portion F61 generates an image to be displayed on the driver display 15 on the basis of the received image generation data. However, the present disclosure is not limited to the configuration as above. The portable terminal 20 may generate an image to be displayed on the driver display 15 and send the resulting image data to the vehicle onboard apparatus 10 as the output data. In such a case, the driver display control portion F61 may combine the obtained image data with a vehicle information image and display the resulting image on the driver display 15 in the similar manner as in the first embodiment.

The first through fifth embodiments described above may be combined appropriately. For example, the first embodiment and the second embodiment may be combined or the first, second and fourth embodiments may be combined. The third embodiment may be adopted for each equipment device or each function as needed.

It is noted that a flowchart or the processing of the flowchart in the present application includes multiple steps (also referred to as sections), each of which is represented, for instance, as S101. Further, each step can be divided into several sub-steps while several steps can be combined into a single step. Furthermore, each step can be also referred to as a device, module, or means.

The portions in the present embodiment classify the interior of the vehicle-side control portion 11 and the terminal-side control portion 21 for convenience paying attention to the functions of the control, and do not mean that the interior of the control is physically partitioned into portions corresponding to the respective portions. Therefore, the respective portions can be realized as a part of a computer program in the form of software, or can be realized by an IC chip or a large scaled integrated circuit in the form of hardware.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular notification control apparatus comprising:
   an operation acceptance portion that accepts an instruction operation performed by a non-driving occupant for an equipment device providing a function available to a user in a vehicle interior, the non-driving occupant being an occupant other than a driver;

an output data acquisition portion that acquires output data outputted from the equipment device in response to the instruction operation received by the operation acceptance portion for notifying the driver of a result of processing according to the instruction operation;

a notification control portion that makes a notification to the driver based on the output data acquired by the output data acquisition portion; and a drive load determination portion that determines whether drive load of the driver is in a high state or in a low state based on a sensor value outputted from a sensor and indicating a running state of a vehicle, wherein:

the notification control portion executes the notification based on the output data acquired by the output data acquisition portion, when the drive load determination portion determines that the drive load is in the low state at a time the output data acquisition portion has acquired the output data;

the notification control portion withholds the notification, when the drive load determination portion determines that the drive load is in the high state at the time the output data acquisition portion has acquired the output data;

the drive load determination portion determines when the drive load changes from the high state to the low state after the notification has been withheld; and the notification control portion executes the notification that has previously been withheld, when the drive load determination portion has determined that the drive load changes from the high state to the low state after the notification has been withheld.

2. The vehicular notification control apparatus according to claim 1, wherein:

the output data includes an image corresponding to a control state of the equipment device or image generation information for generating the image; and the notification control portion includes a driver display control portion that causes a driver display disposed in sight of the driver who faces in a front direction of the vehicle to display the image included in the output data or the image generated based on the image generation information included in the output data as the notification based on the output data.

3. The vehicular notification control apparatus according to claim 2, wherein:

the output data includes sound data when the sound data to be outputted as a sound from a sound output device is included in a response to the instruction operation accepted by the operation acceptance portion;

the notification control portion includes a sound output control portion controlling the sound output device to output the sound data as a sound; and the sound output control portion controls the sound output device to output the sound based on the sound data as the notification made by the notification control portion based on the output data when the output data acquired by the output data acquisition portion includes the sound data.

4. The vehicular notification control apparatus according to claim 2, wherein:

the notification control portion saves the output data acquired by the output data acquisition portion while the drive load determination portion determines that the drive load is in the high state into a memory; and the notification control portion makes the notification based on the output data saved in the memory after when the drive load determination portion determines that the drive load changes from the high state to the low state after the notification has been withheld.

5. The vehicular notification control apparatus according to claim 4, wherein:

when a plurality of items of the output data are saved in the memory while the drive load determination portion determines that the drive load is in the high state, and when the drive load determination portion determines that the drive load is in the low state, the notification control portion makes notification based on a latest output data among the plurality of items of the output data.

6. The vehicular notification control apparatus according to claim 2, wherein:

the operation acceptance portion accepts the instruction operation for each of a plurality of equipment devices;

the driver display control portion is capable of controlling the driver display to concurrently display the image corresponding to each of the plurality of equipment devices;

the output data acquisition portion acquires the output data from any of the equipment devices having performed processing according to the instruction operation;

the notification control portion saves the output data acquired by the output data acquisition portion while the drive load determination portion determines that the drive load is in the high state into a memory while discriminating the equipment devices providing an acquisition source of the output data; and the driver display control portion controls the driver display to display the image included in a latest output data for each of the equipment devices among items of the output data saved in the memory or the image generated based on the image generation information included in the latest output data when the drive load determination portion determines that the drive load changes from the high state to the low state after the notification has been withheld.

7. The vehicular notification control apparatus according to claim 2, wherein:

the notification control portion includes a non-driving occupant display control portion that controls an image to be displayed on a non-driving occupant display disposed at a visually recognizable position for the non-driving occupant; and the non-driving occupant display control portion controls the non-driving occupant display to display the image included in the output data acquired by the output data acquisition portion or the image generated based on the image generation information included in the output data whenever necessary irrespective of a determination result of the drive load determination portion.

8. The vehicular notification control apparatus according to claim 1, further comprising:

a sensor that outputs the sensor value indicating the running state of the vehicle, the sensor outputting the sensor value for at least one of a vehicle speed, acceleration, a steering angle, and a yaw rate, wherein:

the drive load determination portion stores a threshold corresponding to the drive load being in the high state with respect to at least one of the vehicle speed, the acceleration, the steering angle, and the yaw rate; and the drive load determination portion determines that the drive load is in the high state when the sensor value outputted from the sensor indicating the running state of the vehicle exceeds the threshold.

9. A vehicular notification control system, comprising:
a vehicle onboard apparatus that controls an operation of a notification device notifying a driver of predetermined information; and
a portable terminal that is brought into a vehicle and communicates with the vehicle onboard apparatus in two ways to provide a function available to a user in a vehicle interior,
wherein:
the portable terminal includes,
a terminal-side operation acceptance portion accepting an instruction operation made by a non-driving occupant who is an occupant other than the driver for the portable terminal, and
a terminal-side communication processing portion controlling communications with the vehicle onboard apparatus, the terminal-side communication processing portion sending output data to notify the driver of a result of processing performed by the portable terminal according to the instruction operation accepted at the terminal-side operation acceptance portion to the vehicle onboard apparatus;
the vehicle onboard apparatus includes,
a vehicle-side communication processing portion controlling communications with the terminal-side communication processing portion,
an output data acquisition portion acquiring the output data sent from the terminal-side communication processing portion via the vehicle-side communication processing portion,
a notification control portion controlling an operation of the notification device and notifying the driver of a result of processing performed by the portable terminal based on the output data acquired by the output data acquisition portion, and
a drive load determination portion determining whether a drive load of the driver is in a high state or in a low state based on a sensor value, which is outputted from a sensor and indicates a running state of the vehicle;
the notification control portion executes a notification based on the output data acquired by the output data acquisition portion, when the drive load determination portion determines that the drive load is in the low state at a time the output data acquisition portion has acquired the output data;
the notification control portion withholds the notification, when the drive load determination portion determines that the drive load is in the high state at the time the output data acquisition portion has acquired the output data;
the drive load determination portion determines when the drive load changes from the high state to the low state after the notification has been withheld; and
the notification control portion executes the notification that has previously been withheld, when the drive load determination portion has determined that the drive load changes from the high state to the low state after the notification has been withheld.

10. A vehicular notification control apparatus comprising:
an operation acceptance portion that accepts an instruction operation performed by a non-driving occupant for an equipment device providing a function available to a user in a vehicle interior of a vehicle, the non-driving occupant being an occupant other than a driver of the vehicle;
an output data acquisition portion that acquires output data outputted from the equipment device in response to the instruction operation received by the operation acceptance portion for notifying the driver of a result of processing according to the instruction operation;
a drive load determination portion that determines a drive load of the driver by comparing a sensor value outputted by a sensor of the vehicle with a load determination threshold, the drive load determination portion determining that the drive load is in a high state when the sensor value is greater than the load determination threshold and determining that the drive load is in a low state when the sensor value is not greater than the load determination threshold;
a notification control portion that processes the output data acquired by the output data acquisition portion based on the drive load of the driver determined by the drive load determination portion;
wherein:
in response to the drive load determination portion determining that the drive load of the driver is in the high state, the notification control portion saves the output data in an internal memory and withholds making a notification to the driver based on the output data until after the drive load determination portion determines that the drive load is in the low state and the drive load determination portion determines when the drive load of the driver changes from the high state to the low state after the notification portion withholds making the notification to the driver based on the output data;
in response to the drive load determination portion determining that the drive load of the driver changes from the high state to the low state after the notification portion withholds making the notification to the driver based on the output data, the notification control portion executes the previously withheld notification to the driver based on the output data; and
in response to the drive load determination portion determining that the drive load is in the low state, the notification control portion executes the notification to the driver based on the output data acquired by the output data acquisition portion.

11. The vehicular notification control apparatus according to claim 10, wherein the sensor of the vehicle includes at least one of a vehicle speed sensor, an acceleration sensor, a gyro sensor, a steering angle sensor, a brake stroke sensor, an accelerator pedal sensor, and a turn-signal lever position sensor.

* * * * *